United States Patent [19]
Awamura et al.

[11] Patent Number: 5,894,901
[45] Date of Patent: Apr. 20, 1999

[54] ENDLESS TRACK MAGNETIC TRAVELING DEVICE

[75] Inventors: Norio Awamura; Youji Takasu; Shigeto Uchida, all of Kure, Japan

[73] Assignee: Babcock-Hitachi Kabushiki Kaisha, Japan

[21] Appl. No.: 08/718,579

[22] PCT Filed: Dec. 12, 1995

[86] PCT No.: PCT/JP95/02543

§ 371 Date: Oct. 2, 1996

§ 102(e) Date: Oct. 2, 1996

[87] PCT Pub. No.: WO97/21584

PCT Pub. Date: Jun. 19, 1997

[51] Int. Cl.[6] .................................. B62D 55/00
[52] U.S. Cl. .................. 180/9.54; 180/9.46; 180/9.64; 180/6.7; 305/185; 305/202; 305/46
[58] Field of Search .................. 180/9.1, 9.44, 180/901, 9.46, 9.5, 9.54, 9.64, 6.62, 6.7, 9.52; 305/60, 185, 200, 202, 192, 130, 201, 46, 51

[56] References Cited

U.S. PATENT DOCUMENTS

| | | | |
|---|---|---|---|
| 3,682,265 | 8/1972 | Hiraoka et al. | 180/9.1 |
| 3,960,229 | 6/1976 | Shio | 180/901 |
| 4,828,059 | 5/1989 | Naito et al. | 180/9.52 |
| 4,842,086 | 6/1989 | Michna | 180/9.1 |

FOREIGN PATENT DOCUMENTS

| | | | |
|---|---|---|---|
| 47-40635 | 12/1972 | Japan . | |
| 51-79498 | 7/1976 | Japan . | |
| 56-79069 | 6/1981 | Japan . | |
| 60-18463 | 9/1983 | Japan . | |
| 60-18464 | 1/1985 | Japan . | |
| 61-50881 | 3/1986 | Japan . | |
| 61-89184 | 5/1986 | Japan . | |
| 62-90280 | 6/1987 | Japan . | |
| 3-231079 | 10/1991 | Japan | 180/901 |
| 6-144314 | 5/1994 | Japan . | |

*Primary Examiner*—Robert J. Oberleitner
*Assistant Examiner*—Avraham H. Lerner
*Attorney, Agent, or Firm*—Lorusso & Loud

[57] ABSTRACT

Magnets 1 are pressed against a vehicle body (side plates, a rotary shaft, a supporting beam 12 of springs 10, etc.), which travels on an endless track comprising the magnets 1, a chain 5, etc., by auxiliary wheels 9 having a plurality of springs 10 which are different from a chain driving wheels 6a of the endless track, and also suspension function is given between each magnet 1 and the chain 5 by springs 4. When the idler wheels 8a with gears are pressed against the vehicle body by springs 8c, slacks are generated in the endless track in front of the traveling direction, thereby improving the traveling performance for traveling on the traveling surface having an uneven spot or curvatures. Further, a plurality of endless tracks each capable of traveling independently are combined to constitute the traveling device, which form the endless track magnetic traveling device fit for various uses.

34 Claims, 35 Drawing Sheets

FIG. 13
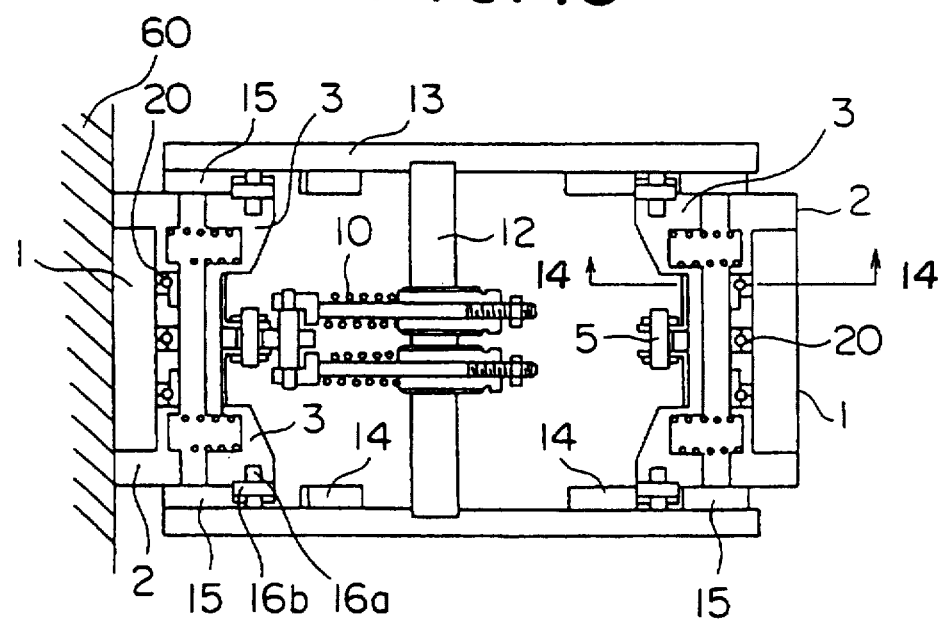
FIG. 14
FIG. 15
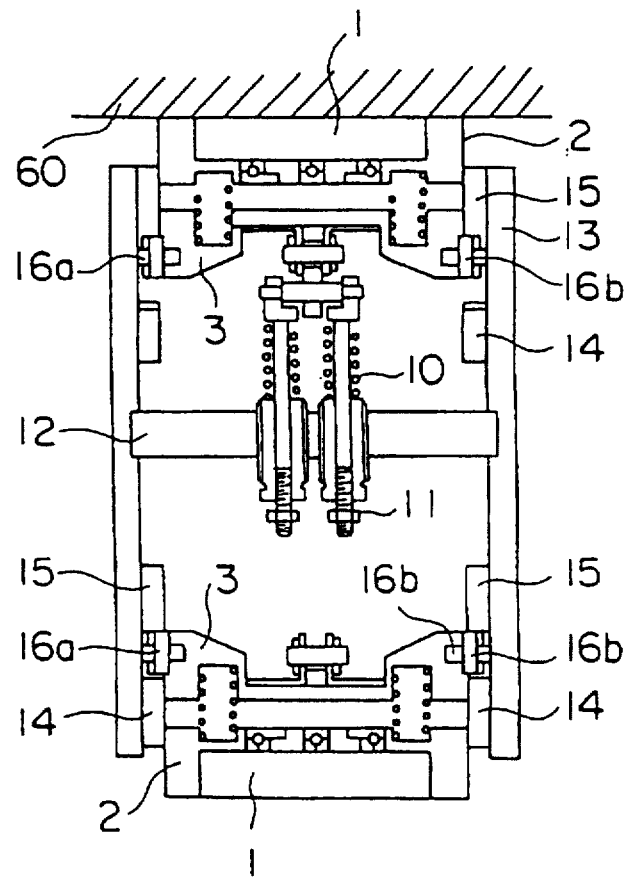

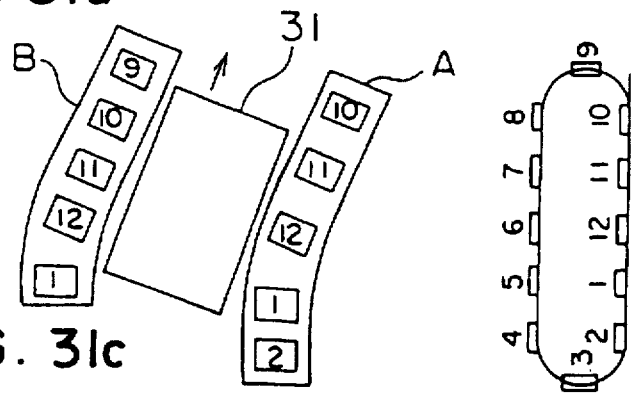
FIG. 31a
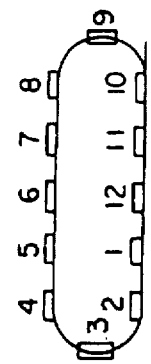
FIG. 31b
FIG. 31c
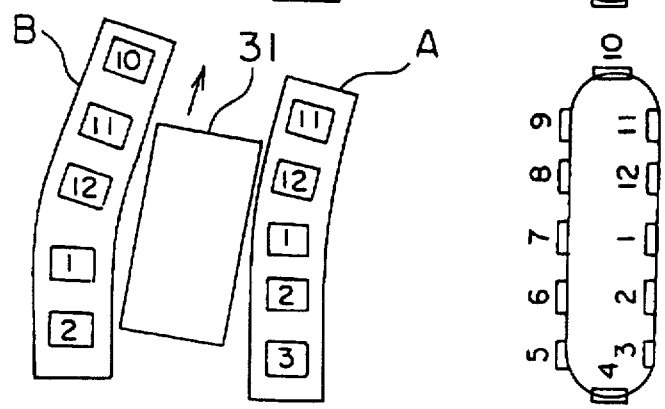
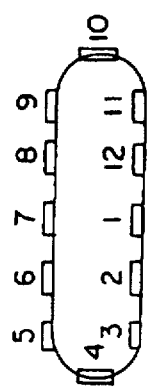
FIG. 31d
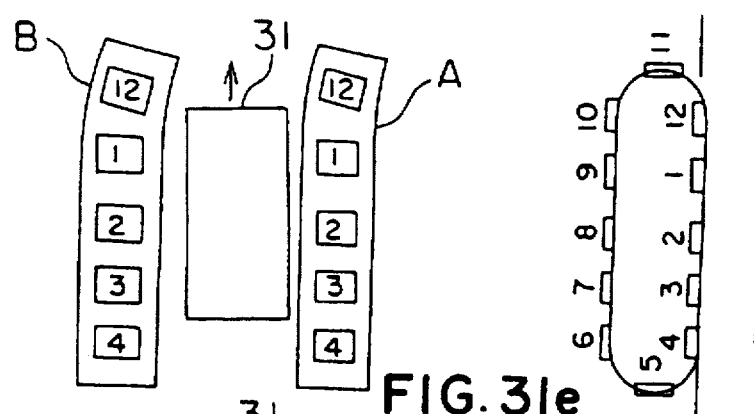
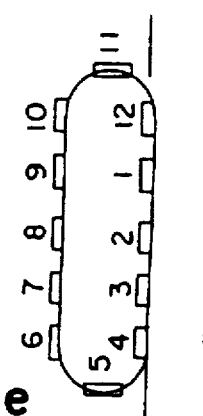
FIG. 31f
FIG. 31e
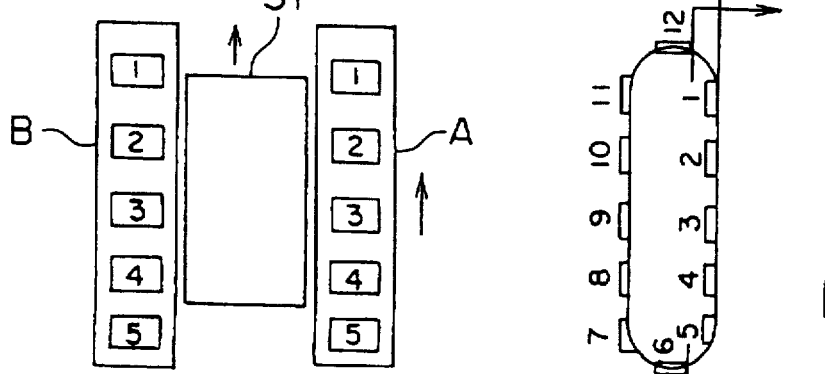
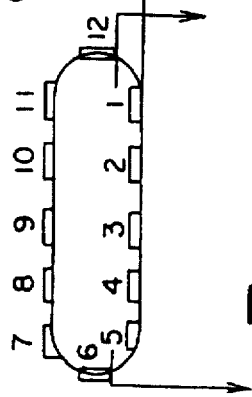
FIG. 31h
FIG. 31g F I G. 37
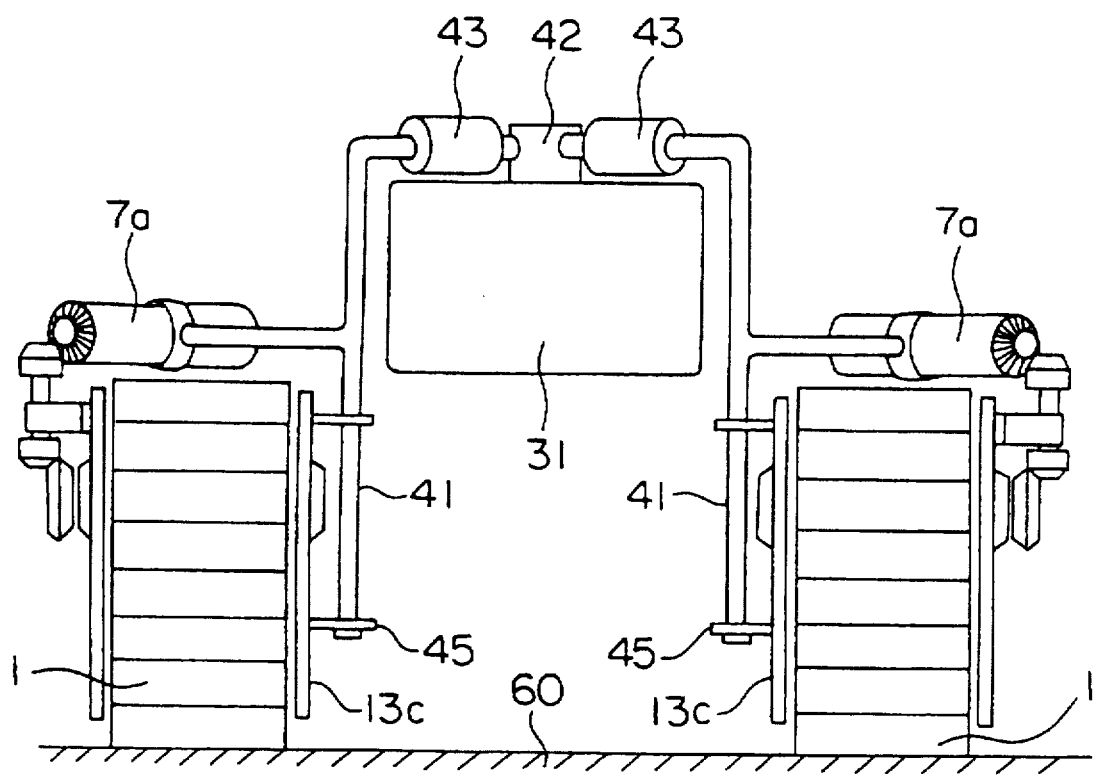

PRIOR ART
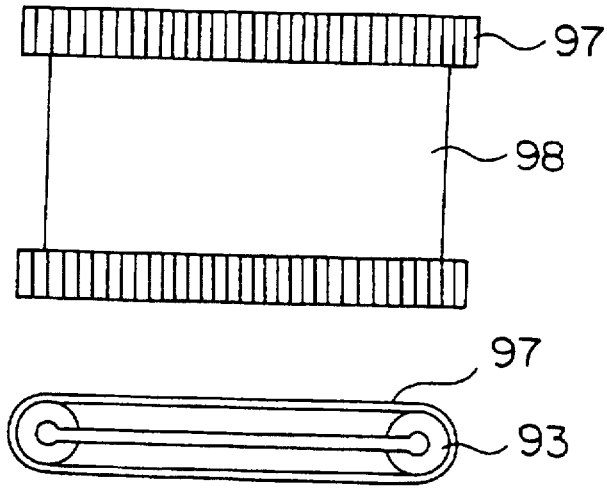
FIG. 63a
FIG. 63b
PRIOR ART
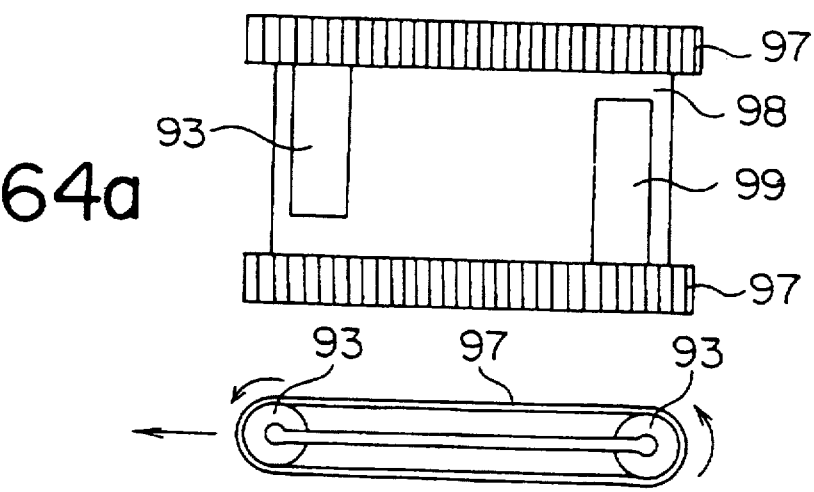
FIG. 64a
FIG. 64b

ENDLESS TRACK MAGNETIC TRAVELING DEVICE

TECHNICAL FIELD

The present invention relates to an endless track magnetic traveling device, particularly, to an endless track magnetic traveling device constituting an endless track or endless tracks by permanent magnets and capable of being self-propelling on a wall surface made of magnetic material such as a steel structure, i.e. on a perpendicular surface or a ceiling surface utilizing attraction of the permanent magnet.

BACKGROUND TECHNOLOGY

There are disclosed conventional endless track magnetic traveling devices as a technology of this type in JP-A47-40635, JP-A51-79498, JP-A 56-79069, JP-A 60-18464, JP-A61-89184, etc., wherein the endless track magnetic traveling device is used as various devices depending on its purpose, for example, an apparatus such as an ultrasonic inspection device.

The conventional endless track magnetic traveling devices set forth above can travel smoothly on a horizontal surface having no uneven spot on the traveling surface, thereby performing an excellent traveling performance. However, these conventional endless track magnetic traveling devices have not considered the traveling surface having an uneven spot.

Further, these conventional devices comprise a vehicle body and two endless tracks which have the same dimensions and are provided at both sides of the vehicle body.

In the conventional endless track magnetic traveling device set forth above, there are following problems to be solved.

First, in the conventional traveling devices of this type, connecting portions for connecting each magnet constituting each endless track are needed to be loosened to have the slack so as to get over the uneven spot of the traveling surface. That is, when there is the slack on each connecting portion, the traveling device can travel on a ceiling surface 60 having an uneven spot 60a as shown in FIG. 58. However, since the weight of the traveling device including driving wheels 93 is applied to magnets 91 located adjacent to both ends of the endless tracks at the front and rear thereof in the traveling direction but not applied to the magnets constituting the endless tracks comprising a combination of the magnet 91 and the chain 92 when traveling on the ceiling surface 60, it is not assured that the danger of falling of the traveling device is sufficiently avoided.

Accordingly, in the conventional traveling device having such a wall surface moving mechanism, it is necessary to increase attraction of each magnet. This is solved by taking a measure, for example, as disclosed in a traveling device of JP-A47-40635 wherein an interval between driving wheels 93 is widened by a spring 94 (FIG. 59), and an endless track is extended in the traveling direction thereof. However, when the endless track is extended, the traveling performance is decreased on the uneven spot of the traveling surface so that the weight of the traveling device can not be supported by all the magnets 91 by way of a chain 92 when traveling on the uneven spot 60a of the ceiling surface 60 as shown in FIG. 60. As a result, there occurs a possibility of the falling of the traveling device. Further, the endless track can not be extended in the traveling direction (to widen the interval between the driving wheels 93) unless the magnets 91 attracted to the traveling wall surface are slid.

To solve the aforementioned problems of the traveling device when traveling on the ceiling surface, a traveling device as disclosed in JP-A 63-90484 has a load dispersion type crawler in which magnets are supported by a guide plate fixed to a traveling device body, so that it can not get over the uneven spot easily.

In the conventional traveling device as disclosed in JP-A61-89184, as shown in FIG. 61, a buffer member( which is not shown but covering an outer periphery of a magnet 91) is provided between magnets 91 and a chain 92 respectively constituting an endless track so as to press the magnets 91 against a traveling surface 60. However, a sufficient stroke is not assured by merely pressing the magnets 91 against the traveling surface 60 with the buffer member between the link-shaped endless track and the traveling surface 60. Accordingly, the traveling device does not sufficiently travel on the traveling surface 60 having a curvature of a large uneven spot such as a weld bead. Still further, since there is no mechanism for pressing the chain 92, and the magnets 91 and the chain 92 are connected to one another by pins 95, the magnets 91 have large freedom in their movement, namely, they are movable largely, leading to a possibility that the magnets 91 interfere with one another.

More still further, there is disclosed in a traveling device in JP-A 2-92788 wherein a linear actuator is disposed on a crawler 1a (traveling device comprising an endless track) which is actuated when a sensor detects the uneven spot 60a of the traveling surface 60 so that the traveling device gets over the uneven spot 60a of the traveling surface 60. This has however the problem that the traveling device becomes large scaled, and the magnets of the endless tracks 97 do not slide at the portion where they are attracted to the traveling surface 60 as denoted by A in FIG. 62. Accordingly, it is necessary to supply endless track to the front of the traveling direction by the length corresponding to the portion where they are recessed at the uneven spot 60a of the traveling surface 60. However, there is not taken sufficient measure to cope with this problem.

Whereupon, there is an invention for a traveling device which travels on a wall surface having a curvature and is disclosed in JP-A3-231079 in which the magnets of the crawler travel along a gap between a guide rail so that the guide rail meeting the curvature must be prepared every time it is needed, which generates a replacement operation.

The conventional crawler comprises, as disclosed in FIG. 63 (a) which is a plan view of the crawler and in FIG. 63 (b) which is a side view, a single body 98 and two endless tracks 97 which are arranged in parallel with each other. The traveling of these endless tracks 97 is controlled by a driving source (not shown) by way of driving wheels 93 so that the traveling device can be operated to be traveled to the right or left or turned. Accordingly, the capacity and the range of application of the traveling device are restricted in view of the structure thereof. Further, in a traveling device as shown in FIGS. 64 (a) and (b), a longitudinal direction of a motor 99 for the driving wheels 93 of each endless track 97 crosses at right angles with the traveling direction of the traveling device, and the motor 99 is arranged inside a vehicle body 98, so that the driving wheels 93 are positioned at the front and rear of the body 98, causing a possibility of occurrence of unstable movement such as the swinging to the right or the left owing to the backlash at each endless track 97 when the traveling device starts the traveling.

Although it is a known technique to perform remote control when mounting a battery or a generator on a vehicle body, there was a problem that battery or the generator is too heavy to be mounted on the magnet crawler, and hence it was difficult to be practiced.

Further, the conventional traveling device of this type has another problem that the sliding portion is worn, iron dust is magnetized by the magnet crawler so that iron dust bites into the sliding position, causing a bad influence on the traveling device since the traveling device employs a steel structure.

Accordingly, it is an object of the invention to provide an endless track magnetic traveling device which is improved in traveling performance when traveling on the traveling surface having an uneven spot or a curvature.

It is another object of the invention to provide an endless track magnetic traveling device which is excellent in utilization thereof.

It is still another object of the invention to provide an endless track magnetic traveling device which is excellent in traveling performance in such a manner that it can turn without damaging the traveling surface and also can travel on the traveling surface even at a high temperature.

It is more still another object of the invention to provide an endless track magnetic traveling device capable of traveling by endless tracks which are easily controllable in their traveling.

It is a still other object of the invention to provide an endless track magnetic traveling device which is lightweight.

It is more still other object of the invention to provide a coupling-type endless track magnetic traveling device capable of traveling on a complex traveling surface and capable of changing the number of endless tracks depending on uses thereof.

SUMMARY OF THE INVENTION

An endless track magnetic traveling device of the present invention comprises a vehicle body having side plates at both sides thereof and an endless track provided at an outer periphery of the vehicle body, wherein the endless track comprises a plurality of magnets coupled in series with a chain, and the vehicle body comprises a chain driving wheel for driving the endless track while the magnets are attracted to a traveling surface formed of magnetic material, and a driving source for driving the chain driving wheel, and wherein the endless track magnetic traveling device further comprises auxiliary wheels each having a plurality of suspensions supported by the vehicle body for pressing the auxiliary wheels against the endless track, elastic members disposed between each magnet and the chain, and an idler wheel which meshes with the chain of the endless track and is supported by the vehicle body by way of elastic members.

The endless track magnetic traveling device of the present invention can be structured in such a manner that the chain driving wheels for driving the endless track and the idler wheel for meshing with the chain are respectively paired, and the pair of chain driving wheels are mounted on the vehicle body at a long side of a trapezoidal endless track, and the pair of idler wheels are mounted on the vehicle body at a short side of the trapezoidal endless track.

Adjusting means for adjusting pressing force of the suspensions can be provided on the auxiliary wheels having a plurality of suspensions. The driving source of the chain driving wheel is provided at an inner side or at an outer side of one of side plates constituting the vehicle body. The driving source of the chain driving wheel has a driving control device controlled by a remote control device.

Further, the chain has a mechanism for preventing the auxiliary wheels having suspensions from being derailed. More further, the elastic members respectively disposed between each magnet and the chain are formed of a pair of elastic members which are arranged in parallel with each other in a direction crossing at right angles with a traveling direction of the traveling device. The magnet and the chain can travel without interfering with each other by setting intervals between neighboring magnets and between each magnet and the chain respectively greater than a given value even if there is an uneven spot on the traveling surface.

Each magnet is thin and it is coated with a smooth plate made of non-magnetic material, and the magnets have elastic members at entire portions thereof contacting the traveling surface or at least at corners thereof contacting the traveling surface.

Two projections are provided on each of inner sides of the side plates of the vehicle body of the endless track magnetic traveling device to define a stroke adjusting portion between the two projections for regulating a stroke range of each endless track and guide wheels are attached to each side plate for moving along the stroke adjusting portion.

The traveling device can easily travel on a curved traveling surface having a large radius of curvature when it is structured in such a manner that each stroke adjusting portion of the side plates has a given curvature, or pressing force and strokes of the suspensions of the auxiliary wheels positioned at the front and rear ends thereof in a traveling direction of the traveling device are made greater than those positioned at other portions.

Further, when the chain and the side plates are flexible with respect to a traveling direction of the endless track magnetic traveling device, the traveling device can turn. For example, the side plates of the vehicle body comprise a plurality of side plate pieces which are loosely and elastically coupled to one another in a traveling direction and in a vertical direction of the traveling device.

Further, it is advisable that the endless track magnetic traveling device of the present invention is structured in such a manner that the side plates constituting the endless track portion or the vehicle body are of an adiabatic structure, or accessories for cooling the endless track portion are provided, so that heat from the endless track portion is not transmitted to the vehicle body.

Further, the endless track magnetic traveling device is structured in such a manner that the endless track portion other than the surfaces where the traveling device contacts the traveling surface is covered with cover material formed of magnetic material or cover material combined with high magnetically permeable material and low magnetically permeable material, so that the magnetism is not leaked outside. Alternatively, when members constituting the endless track other than the magnets constituting the endless track are made of non-magnetic material, it is possible to prevent worn particles of parts which are generated owing to the traveling from entering the gaps between the magnets to exert bad influence.

It is possible to attach a heater for heating the magnets at a portion adjacent to the magnets of the endless track portions in case of a trouble of the traveling device.

The present invention has also the following arrangements.

That is, an endless track magnetic traveling device of the present invention comprises endless tracks formed by coupling a plurality of magnets by a chain, wherein the endless tracks are provided at an outer periphery of the vehicle body, and the endless track, further comprises chain driving wheels for driving the endless tracks while the magnets are attracted to a traveling surface formed of magnetic material, and a driving source for driving the chain driving wheels. The chain driving wheels and the driving source are provided on the vehicle body, wherein the vehicle body comprises two side plates, structures for coupling two side plates, a rotary shaft of the chain driving wheels which are respectively supported by both sides plates at their end portions and a driving source provided at an inner side or outside of one side plate for driving the chain driving wheels, and wherein a single or a plurality of endless tracks are disposed between two side plates.

In the aforementioned endless track magnetic traveling device, two projections are provided on each of inner sides of the side plates to define a stroke adjusting portion between two projections for regulating a stroke range of each endless track. It is preferable that the chain and the side plates are flexible with respect to a traveling direction of the endless track magnetic traveling device so as to turn.

Further, an endless track magnetic traveling device comprises coupling devices capable of coupling at least two endless track magnetic traveling devices capable of traveling independently.

At this time, the coupling devices capable of coupling at least two endless track magnetic traveling devices which are self-propelled independently are detachable or can be arm-shaped ones capable of arbitrarily setting coupling angles between each endless track magnetic traveling device.

The traveling performance can be improved when intervals are defined between the coupling devices for coupling each endless track magnetic traveling device which is self-propelled independently and each endless track magnetic traveling device.

The traveling device can turn when steering devices for changing a traveling direction of the traveling device are provided in the coupling devices for coupling the endless track magnetic traveling devices capable of traveling independently, and the steering devices are coupled to front side plates and rear side plates. At this time, the traveling performance of the traveling device can be improved without interfering with the endless track magnetic traveling device capable of traveling independently by providing intervals between the endless track magnetic traveling devices capable of traveling independently and the coupling devices, or the coupling devices for coupling the endless track magnetic traveling devices capable of traveling independently are divided into plural segments, and these segments are coupled with one another.

Further, the coupling devices for coupling at least two endless track magnetic traveling devices may comprise a first coupling member of the traveling device disposed at two side plates confronting the vehicle body of the endless track magnetic traveling device neighboring parallel positions with respect to a traveling direction of the endless track magnetic traveling device capable of traveling independently, and a second coupling member of the vehicle body of the endless track magnetic traveling device neighboring back-and-forth positions with respect to the traveling direction of the endless track magnetic traveling device capable of coupling with the first coupling member. Alternatively, the coupling devices for coupling at least two endless track magnetic traveling devices may include a coupling mechanism capable of allowing at least one of the devices to travel on a traveling surface three-dimensionally different from those of other devices, the endless track magnetic traveling devices are capable of traveling independently.

Still further, the present invention includes an endless track magnetic traveling device having a solar panel provided on an upper portion of an endless track magnetic traveling device composed of at least two endless magnetic traveling devices which are capable of traveling independently and are coupled with one another.

The endless track magnetic traveling device may comprise an endless track magnetic traveling device including a generator and a battery provided within the vehicle body.

The present invention also includes an endless track magnetic traveling device including a strong magnet attached to the endless track magnetic traveling device at a front and/or a back portion thereof in a traveling direction, wherein the strong magnet does not contact the traveling surface.

Further, the traveling device of the present invention may have a driving source of a magnetic crawler comprising a combination of a mechanical generator and an optical generator, and also may have a battery device which is used to be collected in case of emergency and can be miniaturized.

The endless track magnetic traveling device of the present invention can travel under water or sea water by providing a liquid seal in a driving shaft portion and the coupling device portion.

Still further, if the endless track magnetic traveling device of the present invention is combined with, e.g., an ultrasonic test device and a TV camera, it can perform the following operations by a remote control which are made at locations where operators can not give access thereto, namely, it can inspect an inside of a pipe, an elevated spot in a large pressure vessel, also can perform inspection in the atmosphere of radioactive rays, and can carry an object and a painting device.

Described next is means for improving the traveling performance of the endless track magnetic traveling device of the present invention when traveling on the uneven spot of the traveling surface.

(1) Permanent magnets capable of being attracted to a wall surface made of magnetic material are attracted to the chain of the endless track so that the endless track magnetic traveling device travels.

(2) Magnets of the endless track are pressed against the traveling surface by the endless track press auxiliary wheels having a-plurality of adjustable suspensions which are different from the chain driving wheels of the traveling device, so that the uneven spot can be absorbed between the vehicle body and the chain.

(3) In addition to the above Item (2), when elastic members such as springs having suspension function are provided between each magnet and the chain respectively constituting the endless track, the uneven spot of the traveling surface can be absorbed between each magnet and the chain.

(4) The endless track magnetic traveling device can travel to follow the local uneven spot having a width narrower than that of the magnet by arranging an elastic member such as springs between each magnet and each chain at the right and left of each magnet (direction crossing at the right angles with a traveling direction of the traveling device).

(5) The following performance of the endless track magnetic traveling device traveling on the uneven spot of the traveling surface can be improved by combining suspension functions as set forth in the above Items (2) and (3).

(6) Since there is provided the mechanism for generating slacks in the chain of the endless track in front of the traveling direction by idler wheels which are supported by the vehicle body by way of springs while meshing with the chain of the endless track, the chain is supplied to the uneven spot of the traveling surface, thereby improving the following performance of the endless track magnetic traveling device traveling on the uneven spot of the traveling surface.

(7) If the chain and both side plates are structured to be flexible in a traveling direction of the endless track magnetic traveling device (e.g. the chain coupling portion has a structure to absorb slack and the side plates have a structure for coupling a plurality of side plate pieces by a loose coupling mechanism), the slack can be absorbed by the chain and the coupling portion of both side plates, even if the endless track magnetic traveling device turns. If a plurality of side plates are employed, each side plate can be bent freely so that the endless track magnetic traveling device can travel smoothly. As a result, the slide between the traveling surface and the magnets hardly occurs, thereby preventing the traveling surface from being damaged by friction.

The operation of the endless track magnetic traveling device when traveling using a single endless track will be described next.

(1) The endless track is clamped by two side plates and the driving source of the endless track and the chain driving wheel are attached about the side plates as fulcrums, so as to permit the traveling device to travel by a single endless track. The endless track is disposed between the side plates and parts such as a support necessary for preventing the endless track from being derailed, so that the traveling device can travel with a single endless track.

(2) The auxiliary wheels having a plurality of suspensions are supported by structures for coupling two side plates, each magnet on the endless track can be pressed against the traveling surface so as to give a uniform attraction to each magnet, so that the traveling surface can follow the traveling surface. Further, the repulsion from the traveling surface can be supported by two side plates by way of the structures for coupling two side plates, and hence the endless track can freely travel as an independent traveling device.

Still further, when a plurality of traveling devices having the endless tracks each capable of traveling independently are coupled to one another, and are controlled in their traveling, they form the endless track magnetic traveling device which is fit for various uses.

For example, when two independent endless tracks each having the same size are coupled with each other while they are arranged in parallel with each other, they form an ordinary endless track magnetic traveling device. When four independent endless tracks are coupled with one another while they are arranged in parallel with each other, they form an endless track magnetic traveling device capable of carrying a large load. Further, when the independent endless tracks having different sizes are coupled with each other while they are arranged in parallel with each other, they form an endless track magnetic traveling device which is excellent in turning performance in a specific direction.

BRIEF DESCRIPTION OF THE DRAWINGS

in FIG. 6

FIG. 13 is a view of an internal structure of the endless track magnetic traveling device in a state where the traveling device traverses a perpendicular traveling surface (cross sectional view taken along B—B in FIG. 4);

FIG. 14 is a cross sectional view taken along A—A in FIG. 13;

FIG. 15 is a view of an internal structure of the endless track magnetic traveling device in a state where the traveling device travels on a ceiling surface (cross sectional view taken along B—B in FIG. 4);

FIG. 31 is a view for explaining a manner of turning of a flexible endless track magnetic traveling device;

FIG. 37 is a front view of the traveling device in FIG. 35;

FIG. 63 (a) is a schematic plan view of a conventional crawler traveling device;

FIG. 63 (b) is a schematic side view of a conventional crawler traveling device in FIG. 63 (a);

FIG. 64 (a) is a schematic plan view of another conventional crawler traveling device; and FIG. 64 (b) is a schematic side view of another conventional crawler traveling device in FIG. 64 (a).

BEST MODE FOR CARRYING OUT THE INVENTION

Various embodiments of the present invention will be now described. The present invention is not limited to the embodiments as set forth hereunder.

Figure 1:
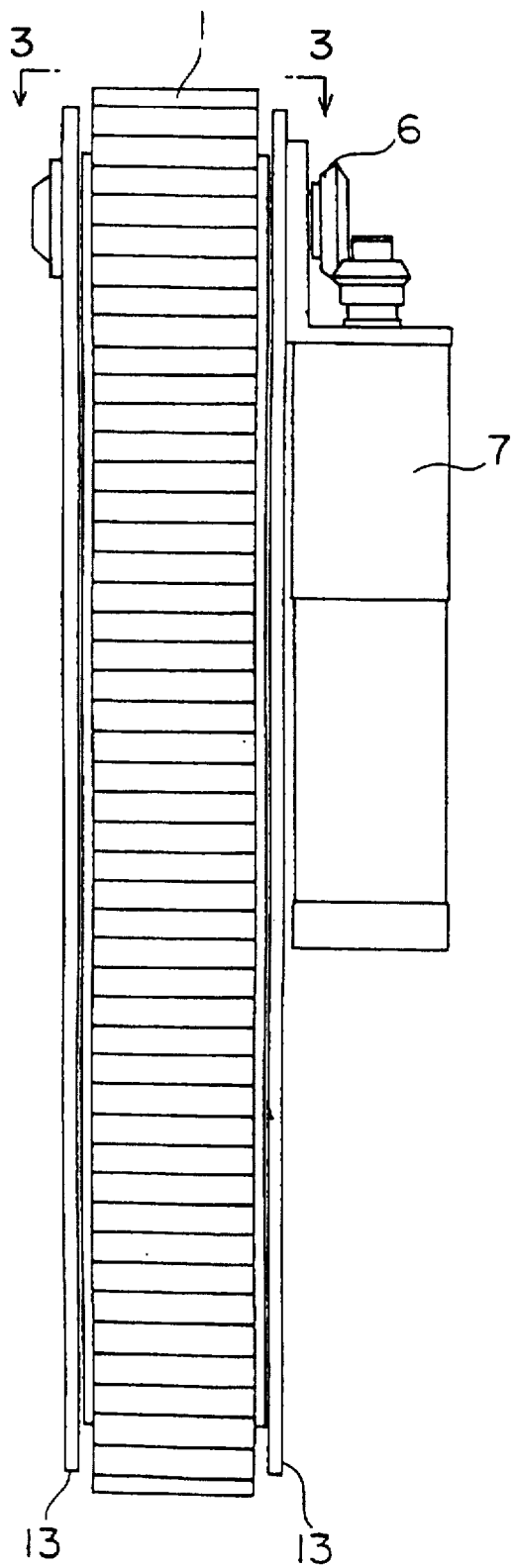
FIG. 1 is a view showing an external appearance of an arrangement of a endless track magnetic traveling device according to a first embodiment of the present invention.
Figure 2:
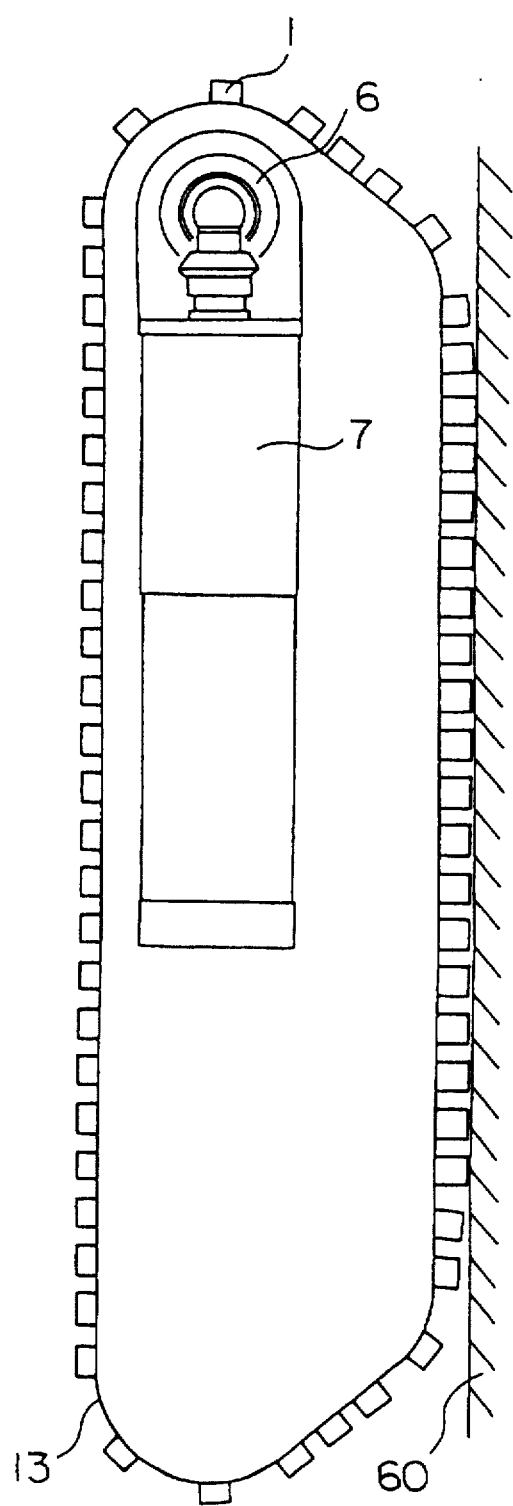
FIG. 2 is a side view of the endless track magnetic traveling device in FIG. 1.
Figure 3:
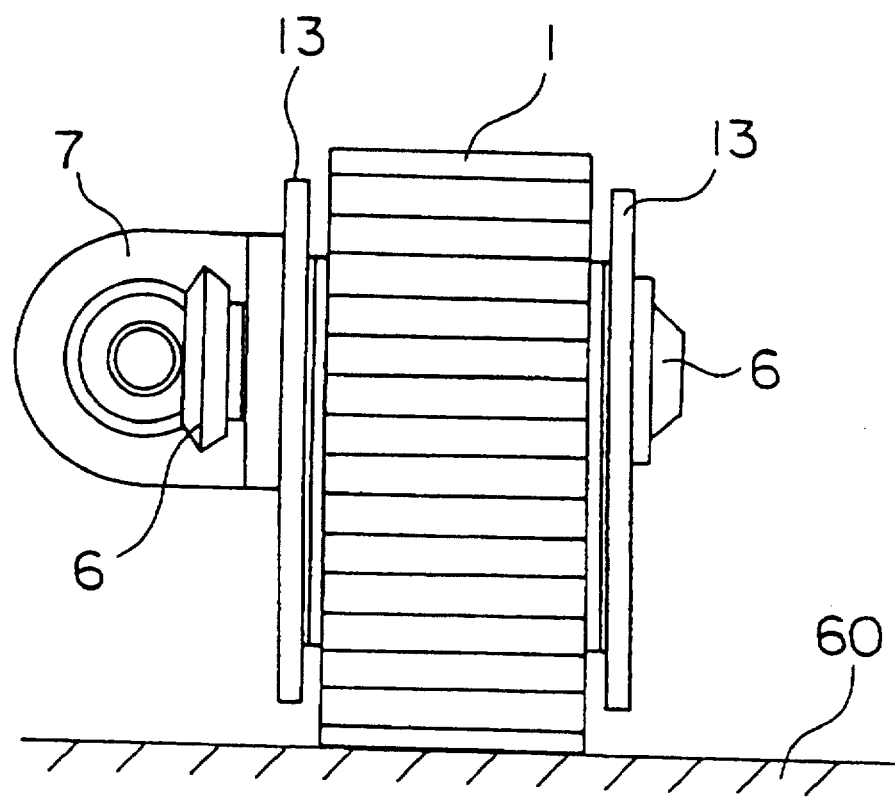
FIG. 3 is a view as viewed from line A—A.
Figure 5:
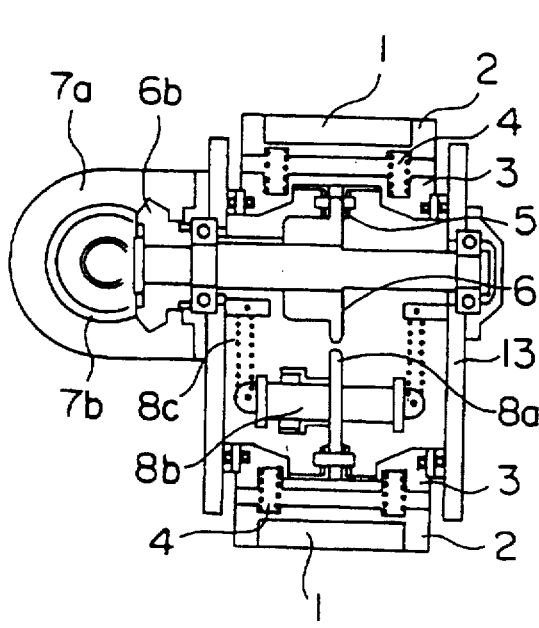
FIG. 5 is a cross sectional view taken along line A—A in FIG. 4.
Figure 4:
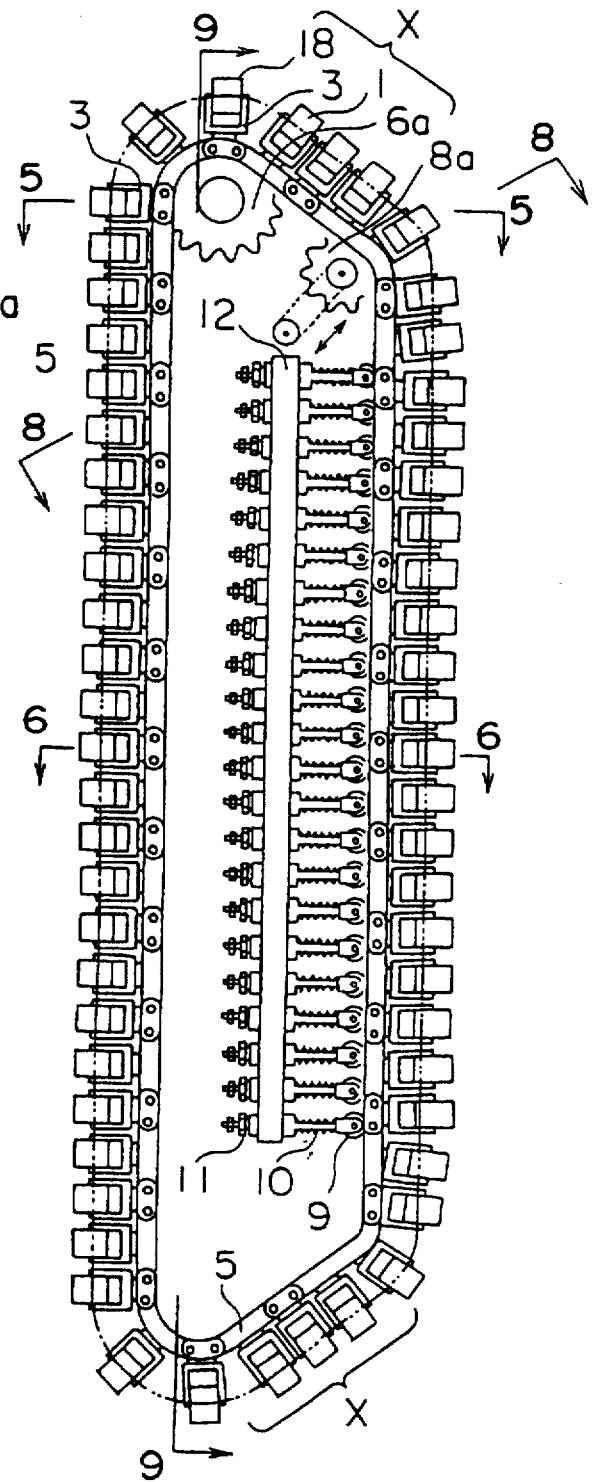
FIG. 4 is a view showing an internal structure of the endless track magnetic traveling device according to the first embodiment of the present invention.
Figure 6:
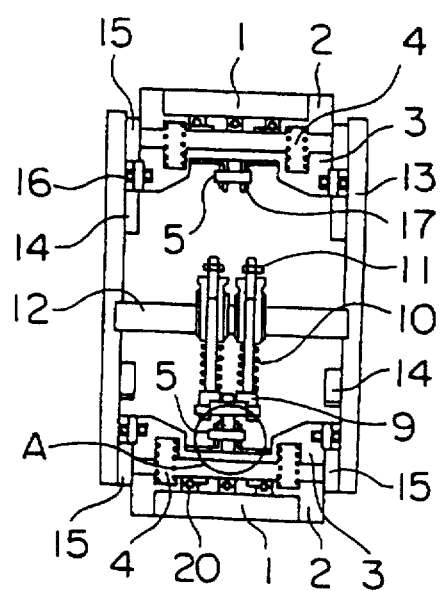
FIG. 6 is a cross sectional view taken along line B—B in FIG. 4.
Figure 7:
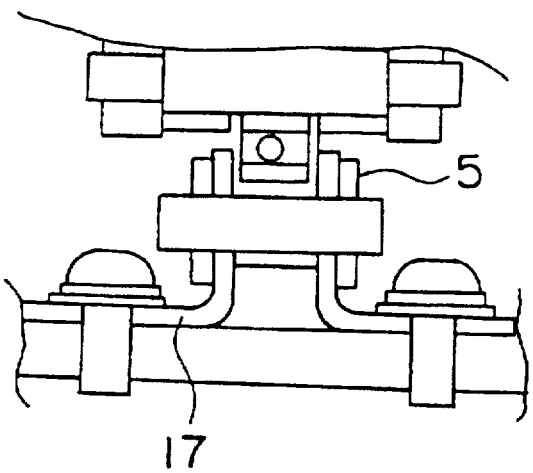
FIG. 7 is an enlarged view of a portion as denoted by an extension line A.
Figure 8:
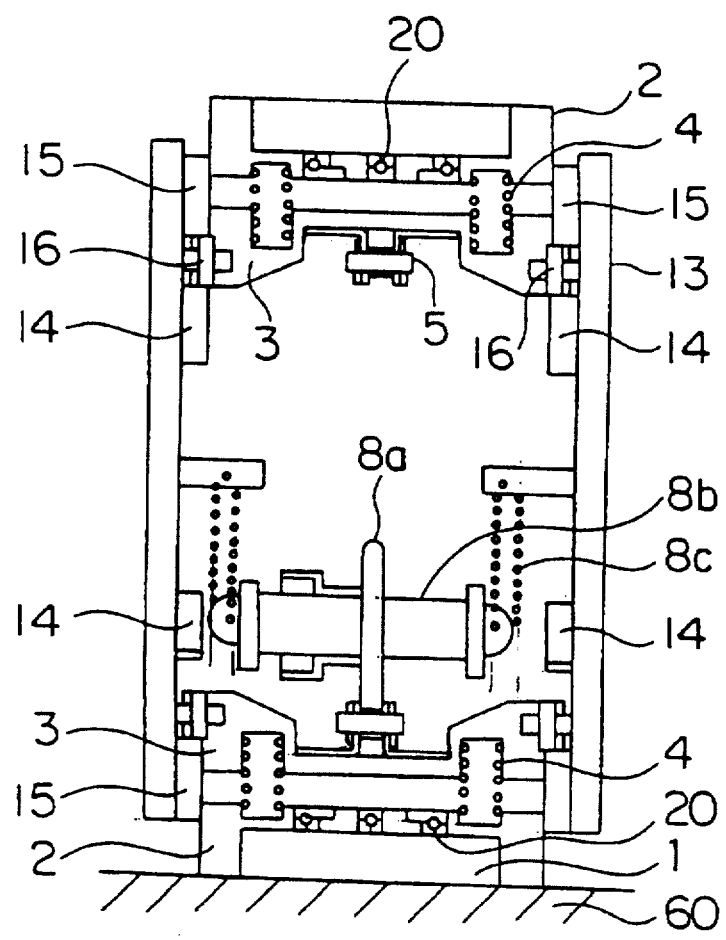
FIG. 8 is a cross sectional view taken along line D—D in FIG. 4.
Figure 9:
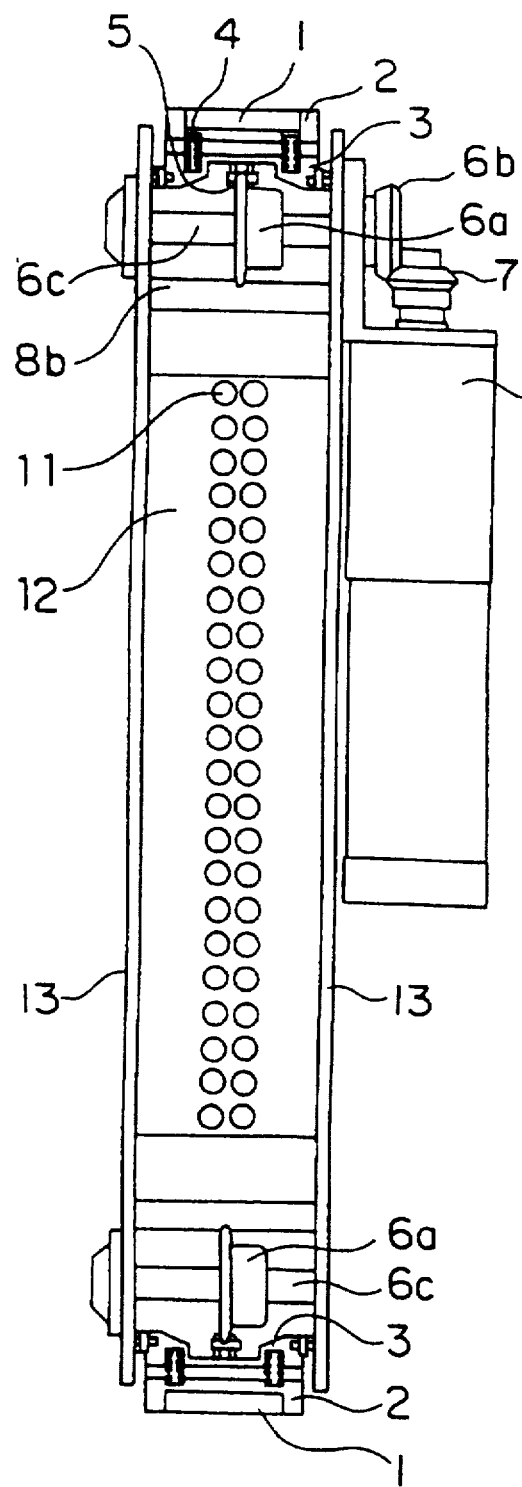
FIG. 9 is a cross sectional view taken along line C—C in FIG. 4.
Figure 10:
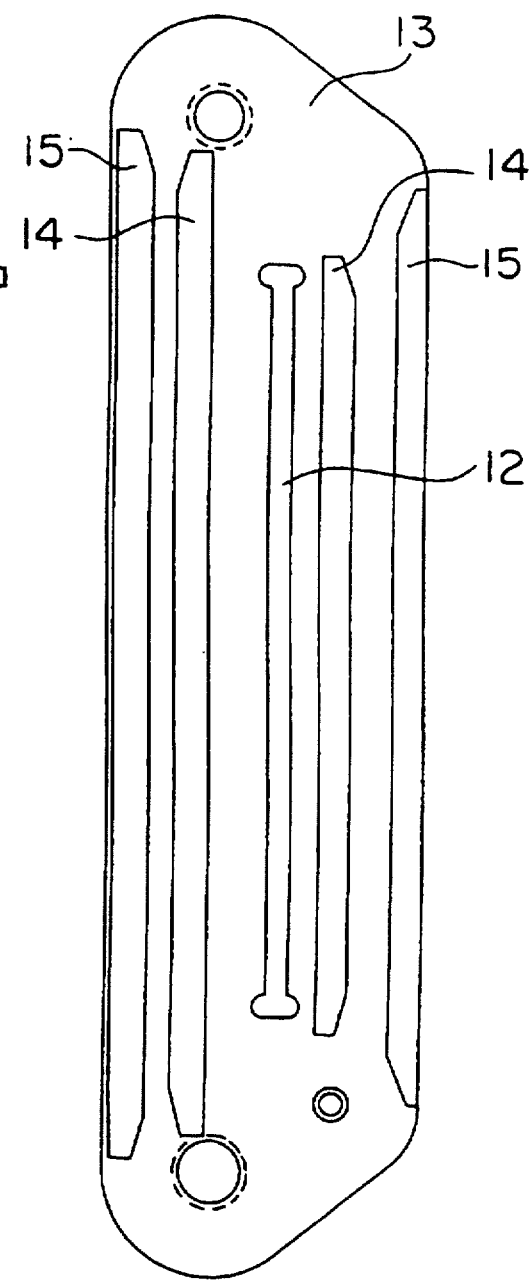
FIG. 10 is a view of a side plate of the endless track magnetic traveling device as viewed from the inside thereof.

A plan view of the traveling device according to an embodiment of the present invention is shown in FIG. 1, and a side view is shown in FIG. 2. A view taken along line A—A is shown in FIG. 3. An internal structure of the side portion of the traveling device removing the side plate in FIG. 2 is shown in FIG. 4, a view taken along the line A—A in FIG. 4 is shown in FIG. 5, a view taken along line B—B in FIG. 4 is shown in FIG. 6, an enlarged view of a portion as denoted by an extension line A in FIG. 6 is shown in FIG. 7, a view taken along line D—D in FIG. 4 is shown in FIG. 8, a view taken along line C—C in FIG. 4 is shown in FIG. 9, and a view of a side plate of the traveling device as viewed from the inside thereof is shown in FIG. 10.

An endless track magnetic traveling device comprises a flat sheet-shaped magnet 1, a magnet receivers 2, a magnet holder 3, pins 20 for coupling the magnet receivers 2 and the magnet holder 3, a pair of springs 4 disposed between the magnet receivers 2 and the magnet holder 3, and a chain 5. The magnet receivers 2 and the magnet holder 3 are coupled to each other by way of the pins 20 (FIG. 14 shows a state where the magnet receivers 2 (the magnet 1) and the magnet holder 3 are coupled to each other by way of the pins 20). Each interval between the magnet receivers 2 and the magnet holder 3 is maintained by the springs 4. Since the magnet holder 3 is coupled to the chain 5, the magnet 1, the magnet receivers 2, the magnet holder 3 and the chain 5 are respectively integrally connected with one another with a given freedom of movement, thereby forming the endless track.

Driving wheels 6a with gears travel on the endless track comprising a plurality of components as set forth above. Each driving wheel 6a with a gear is integrally attached to each rotary shaft 6c which penetrates side plates 13 and is supported thereby. Each driving wheel 6b with a bevel gear is fixed to an end of the rotary shaft 6c which extends outward from one side plate 13. The driving wheel 6b with a bevel gear engages with a bevel gear 7b which is fixed to a rotary shaft (not shown) of a motor 7a provided at a wall surface of the side plate 13. In such a manner, the driving wheel 6a with a gear can be rotated by the motor 7a so that the chain 5 can be driven by the turning effort of the driving wheel 6a with a gear.

A pair of driving wheels 6a are supported by the trapezoidal side plates 13 at corners of the long sides thereof. The driving wheels 6a may be structured in such a manner that one forms a driving wheel and the other forms a driven wheel. Further, a pair of idler wheels 8a are supported by the trapezoidal side plates 13 at corners of the short sides thereof (although the driving wheels 6a and the idler wheels 8a are respectively shown at the corner of the long side of the side plate 13 in FIGS. 4 and 38, actually they are provided at both corners of the long side of the side plate 13), and the gears of the idler wheels 8a press the chain 5 while meshing with the chain 5 from the inside of the traveling device. Each idler wheel 8a is rotatably fixed to a rotary shaft 8b which is elastically supported by the side plates 13 by way of a pair of springs 8c. The endless track comprising the pair of driving wheels 6a and the pair of idler wheels 8a forms a trapezoidal track so that it can travel along circumferential surfaces of the side plates 13. A plurality of auxiliary wheels 9 each having springs are provided and arranged with one another so as to press the endless track against the trapezoidal short side thereof from the inside of the traveling device. Each end of the springs 10 for pressing the auxiliary wheels 9 against the chain 5 of the endless track is pressed against a supporting beam 12 (see to FIG. 9) supported by the side plates 13. Screws 11 for adjusting pressing force of each spring 10 are provided on the supporting beam 12 at the side opposite to the side where the springs 10 are provided.

Stroke adjusting plates 14 (inner side) and stroke adjusting plates 15 (outer side) are fixed to the side plates 13 for preventing the endless track from being come off the side plates 13. Guide wheels 16 for traveling between the stroke adjusting plates 14 and 15 are attached to the magnet holder 3. The endless track can be prevented from being come off the side plates 13 by these stroke adjusting plates 14 and 15, and the guide wheels 16. Further, the guide wheels 16 can receive the load of the traveling device by way of the stroke adjusting plates 14 and 15 when the traveling device travels on the perpendicular wall surface in a lateral direction (see to FIG. 13).

The chain 5 is coupled to the magnet holder 3, and an auxiliary wheel guide 17 is attached to the chain 5 so as to prevent the auxiliary wheels 9 from being derailed. Further, a part of the magnets 1 is covered with a rubber 18 (FIG. 4) at the cornered portions thereof so that the magnets 1 are prevented from being slid. The magnet 1 is covered with a sheet such as flexible thin stainless steel, and iron dust attracted to the magnet 1 can be effectively removed by the rubber 18.

The traveling operation of the traveling device having the aforementioned arrangement will be now described.

Although the magnets 1 constituting the endless track are attracted to a traveling surface 60 made of magnetic material, when the traveling device travels on the traveling surface 60, the turning effort or driving force of the motor 7a rotates one of the driving wheels 6a by way of the intermediate bevel gear 7b, the driving wheel 6b with a bevel gear and the rotary shaft 6c so that the teeth of the driving wheel 6a meshes with the groove of the chain 5 so as to generate a force for driving the endless track comprising the magnet 1, the magnet receivers 2, the magnet holder 3, the pins 20, the guide wheels 16, the springs 4 and the chain 5 while the chain 5 serves as the track. If this driving force is set to be greater than attraction of the magnets 1, the magnets 1 move away from the traveling surface 60 so that the traveling device can travel on the traveling surface 60. At this time, since a plurality of auxiliary wheels 9 provided in parallel with one another and each having springs press the chain 5 of the endless track, the magnet 1 can be surely attracted to the traveling surface 60.

The operation of the traveling device when traveling on the horizontal plane of the traveling surface 60 having an uneven spot will be described now with reference to FIGS. 11 and 12 which are taken along the line B—B of FIG. 4.

Figure 11:
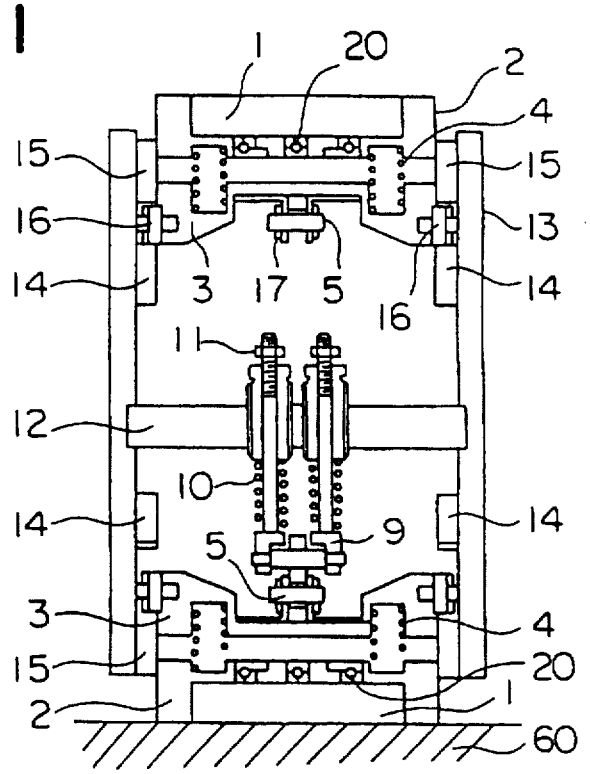
FIG. 11 is a view of an internal structure of the endless track magnetic traveling device in a state where the traveling device travels on a plane surface (cross sectional view taken along the line B—B in FIG. 4)

As shown in FIG. 11, when the traveling surface 60 is substantially flat, the traveling device can safely travel while the movement of the magnet 1 is adjusted finely by the springs 4. Further, when there is an uneven spot 60a on the traveling surface 60a s shown in FIG. 12, the movement of the magnet 1 is transmitted to the supporting beam 12 by way of the springs 4, the magnet holder 3, the auxiliary wheels 9 and the springs 10, but the movement of the magnet 1 in the direction of height of the uneven spot 60a is absorbed by the springs 4 and 10. If the height of the uneven spot 60a of the traveling surface 60 is less than the moving distance of the guide wheels 16 which move between the stroke adjusting plates 14 and 15, the side plates 13 can get over the uneven spot 60a of the traveling surface 60.

However, if the height of the uneven spot 60a of the traveling surface 60 exceeds the total length of the moving distance of the guide wheels 16 between the stroke adjusting plates 14 and 15 and the stroke ranges of the springs 4, the movement of the magnet 1 is transmitted to the entire traveling device including the side plates 13 by way of the supporting beam 12, so that the entire traveling device tends to float (if the traveling surface 60 has an convex portion) or tends to sink (if the traveling surface 60 has a concave portion). However, the springs 10 among a plurality of springs 10 and the springs 4 of the traveling device which are not located over the uneven spot 60a of the traveling surface 60 tend to press the magnets 1 against the traveling surface 60, so that the magnets 1 are surely attracted to the traveling surface 60, thereby ensuring the stable traveling of the traveling device as a whole. Further, even if there is an uneven spot locally on the traveling surface 60a s shown in FIG. 12, since there are two springs 4 with respect to the single magnet 1 in the direction to cross at right angles with the traveling direction of the traveling device and the springs 10 are pressed by the magnet holder 3, the traveling device can easily get over the local uneven spot. In such a manner, the traveling device can easily respond to or follow the uneven spot even if the uneven spot 60a is located on the traveling surface in the direction to cross at right angles with the traveling direction.

Even if the traveling device travels on the traveling surface 60 having a curvature, not shown, the magnets 1 are attracted to the traveling surface 60 likewise the case where it travels on the uneven spot 60a, thereby ensuring the stable traveling of the traveling device as a whole.

The improved traveling performance of the traveling device when getting over the uneven spot 60a of the traveling surface 60 will be now described.

Figure 62:
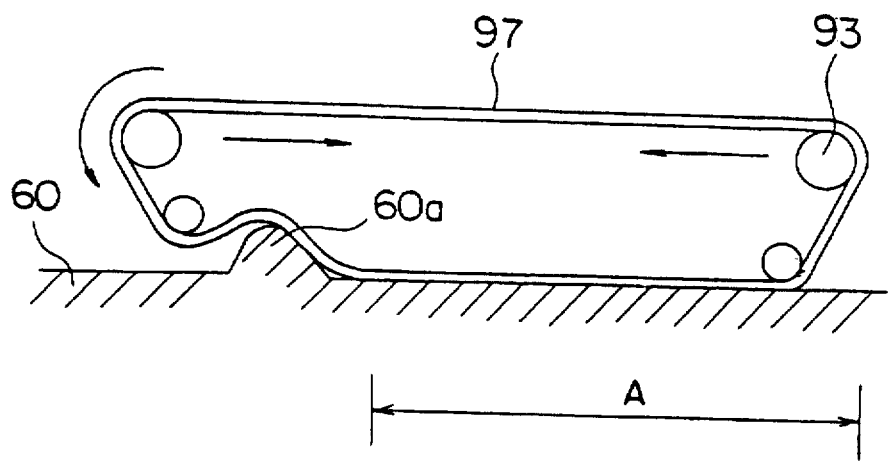
FIG. 62 is a view showing a state where the conventional traveling device travels on a traveling surface having an uneven spot.

(1) When slacks are generated in the chain 5 between the driving wheel 6a and the idler wheel 8a (generated at the portion denoted by X in FIG. 4), the magnet 1 is supplied to such uneven spot 60a of the traveling surface 60a s shown in FIG. 62, so that the traveling device can easily get over the uneven spot 60a of the traveling surface 60. That is, in case of the conventional endless track, although the traveling device floats as it travels because of the uneven spot 60a of the traveling surface 60, so that the chain 5 must be made flexible and sufficiently supplied in front of the uneven spot 60a of the traveling surface 60 to prevent the vehicle body from floating. However, since the magnets I are firmly attracted to the traveling surface 60, the chain 5 does not slide, and hence it can not be supplied in front of the uneven spot 60a. Accordingly, it is necessary to improve the traveling performance of the traveling device to get over the uneven spot 60a of the traveling surface 60 by increasing the circumferential length of the chain 5 in advance, and by allowing the structure of the vehicle body to be contracted in the direction of the height and length of the chain 5 when the traveling device gets over the uneven spot 60a of the traveling surface 60 so as to supply the chain 5 in front of the uneven spot 60a for generating sufficient slack in the chain 5. The traveling performance to get over the uneven spot of the traveling surface is further improved if each magnet itself is structured to be flexible.

The slack is generated in the entire chain 5 along the circumferential direction thereof because a pair of driving wheels 6a are disposed on the long side of the trapezoidal endless track while forming the traveling surface at the short side of the trapezoidal track of the endless track formed by a pair of idler wheels 8a and a pair of driving wheels 6a, then the chain 5 and each magnet 1 are coupled with each other by way of the springs 4, then the chain 5 is always pressed by the auxiliary wheels 9 and then the springs 4 are contracted if there is the uneven spot on the traveling surface 60.

(2) Since the pair of driving wheels 6a are disposed on the cornered portions of the endless track at the long side thereof not on the short side thereof which contacts the traveling surface 60, the traveling device easily gets over the uneven spot 60a of the traveling surface 60.

(3) Since each idler wheel 8a, which is freely rotatably attached to the rotary shafts 8b supported by the side plates 13, presses the chain 5 as shown in FIG. 8, and the chain 5 acts upon the magnet 1 by way of the pair of springs 8c, so that the traveling device can move flexibly relative to the uneven spot 60a of the traveling surface 60. As a result, the idler wheels 8a together with the pair of springs 8c absorb the movement of the traveling device traveling on the uneven spot 60a of the traveling surface 60 before the traveling device floats as a whole so that the traveling device easily gets over the uneven spot 60a of the traveling surface 60.

(4) The traveling device also gets over the uneven spot 60a of the traveling surface 60 if the intervals between the magnet 1 and the magnet receivers 2 are increased or the intervals between the neighboring magnets 1 are increased.

Described next with reference to FIGS. 13 and 15 are operation of the traveling device when traveling in the direction to traverse a perpendicular plane of the traveling surface 60, and when traveling on a ceiling surface.

When the traveling device travels on the perpendicular traveling surface 60 in the direction to traverse the same, the magnet 1 and the magnet holder 3 coupled to the magnet 1 by way of the pins 20 (see to FIG. 14 which is a view taken along line A—A in FIG. 13) are respectively supported by the stroke adjusting plates 15. In addition to the movement of the endless track 25 traveling on the plane traveling surface 60a s explained in FIG. 11, the traveling device including the motor 7a (see to FIG. 5) travels on the side plates 13 while it is supported by the guide wheels 16b including axles 16a which are fixed to the magnet holder 3.

Further, as shown in FIG. 15, when the traveling device travels on the ceiling surface 60, the stroke adjusting plates 15 dangles from the magnet holder 3 coupled to the magnet 1 which is attracted to the traveling surface 60 so that it can travel without falling.

Figure 16:
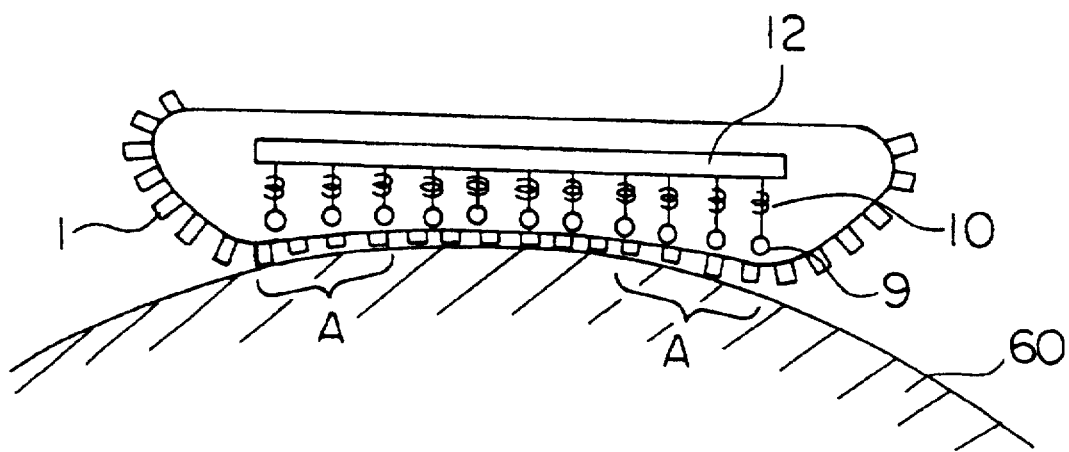
FIG. 16 is a schematic view showing a state where the endless track magnetic traveling device travels on a traveling surface having a curvature.

The traveling operation of the traveling device on the traveling surface 60 having a curvature will be described with reference to schematic views showing the traveling device in FIGS. 16 and 17.

Although the traveling device shown in FIGS. 1 through 15 can respond to or follow the traveling surface 60 having the curvature to a certain extent by a double suspension effect of the springs 10 and the springs 4 (see to FIGS. 5 and 6), the magnets I of the endless track can be safely pressed against the traveling surface 60 having the curvature by increasing the strength of the springs 10 attached to the auxiliary wheels 9 in the longitudinal direction of the traveling device at both sides (the extent denoted by A in FIG. 16), and increasing the strokes of the springs 10.

Figure 17:
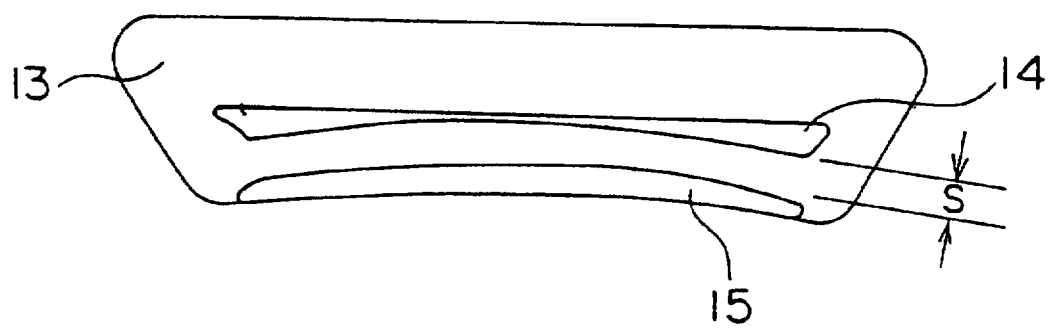
FIG. 17 is a modified example of the projections on side plate of the endless track magnetic traveling device of the invention.

Further, as shown in FIG. 17, if an interval S between the stroke adjusting plate 14 (inner side) and the stroke adjusting plate 15 (outer side) to be fixed to the side plates 13 is increased, the range of stroke of each guide wheel 16 (see to FIG. 8) is increased so that the suspension effect of the springs 10 is further improved, and the stroke adjusting plates 14 and 15 can have such curvatures that they do not obstruct the traveling of the traveling device on the plane traveling surface 60. It is not necessary to conform the curvatures of the stroke adjusting plates 14 and 15 strictly to the curvature of the traveling surface 60 owing to the suspension effect of the springs 10, so that the traveling device can improve in its performance to respond to or follow the curved traveling surface 60.

This is described more in detail. Supposing that the entire length of the traveling device is 400 mm and the total stroke (the total strokes of the springs 4 and the springs 10) is 30 mm, the traveling device can travel on the traveling surface 60 having the curved surface whose radius is 1300 mm from the plane surface.

The traveling device, which travels while being attracted to the traveling surface 60 made of magnetic material such as a steel structure, can be driven by a battery or a generator or a cableless mechanism composed of a combination thereof, or driven by a remote control such as a radio control.

According to the endless track magnetic traveling device of the present invention, when the magnet 1 and the magnet receivers 2 or the side plates 13 are covered with adiabatic members, there is formed a structure for cooling the magnet 1 and the magnet receivers 2 so that the temperature of the traveling device can be reduced even if the temperature of the traveling surface 60 is high. For example, in the traveling device in FIG. 18 (modification of the traveling device taken along the line B—B in FIG. 4), it is possible to prevent the temperature of the traveling device from being increased by providing a plurality of hollow portions 2a in the magnet receivers 2 or by manufacturing the magnet receivers 2 by a poor conductor such as ceramic.

Figure 18:
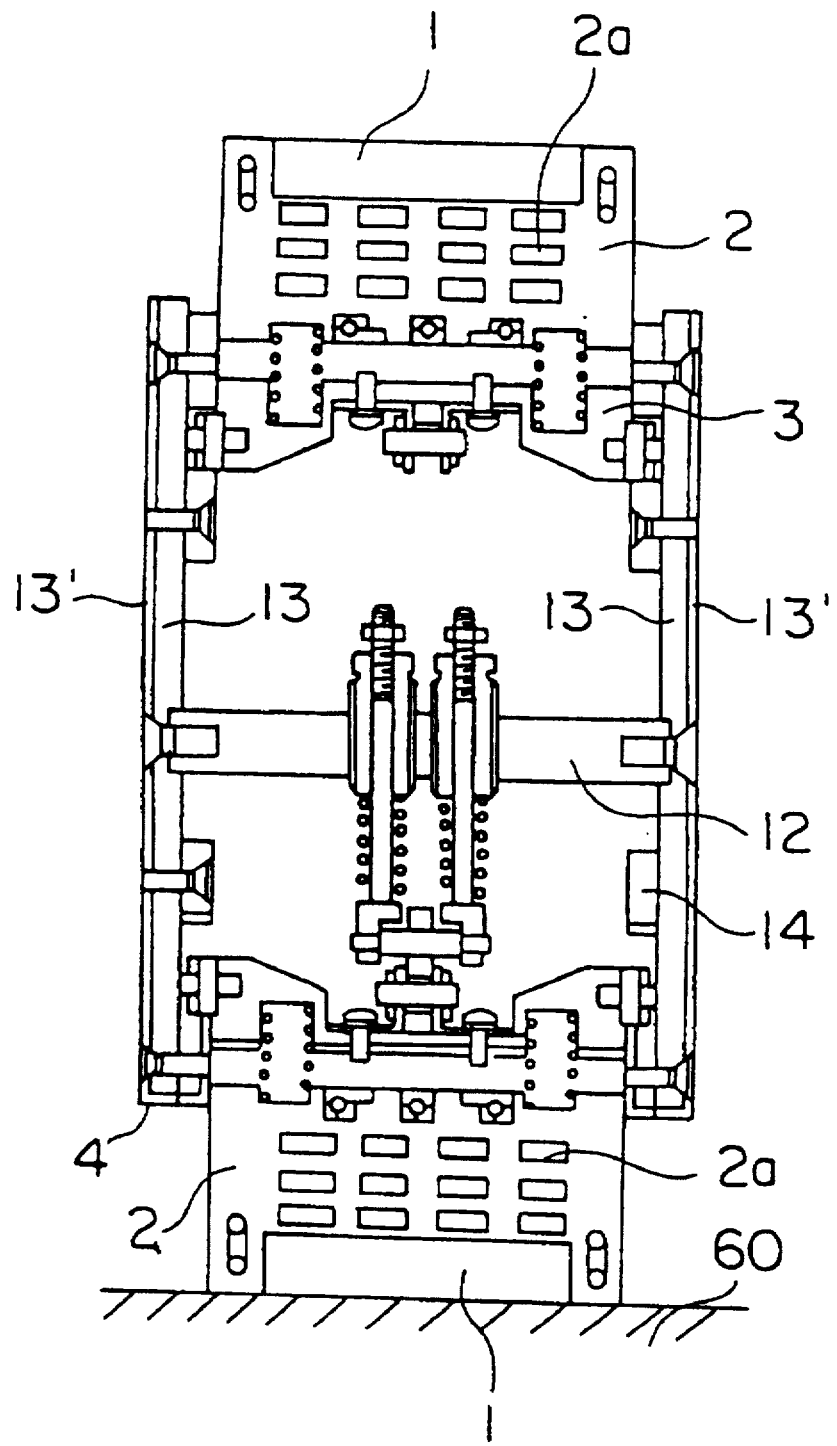
FIG. 18 is a modification of an endless track magnetic traveling -device (corresponding to a cross sectional view taken along the line B—B in FIG. 4) of the invention.

Further, the endless track magnetic traveling device may be structured in such a manner that portions other than the magnet receivers 2, e.g. the side plates 13 are made of adiabatic material, or the side plates 13 are covered with adiabatic members 13' (FIG. 18).

Figure 19:
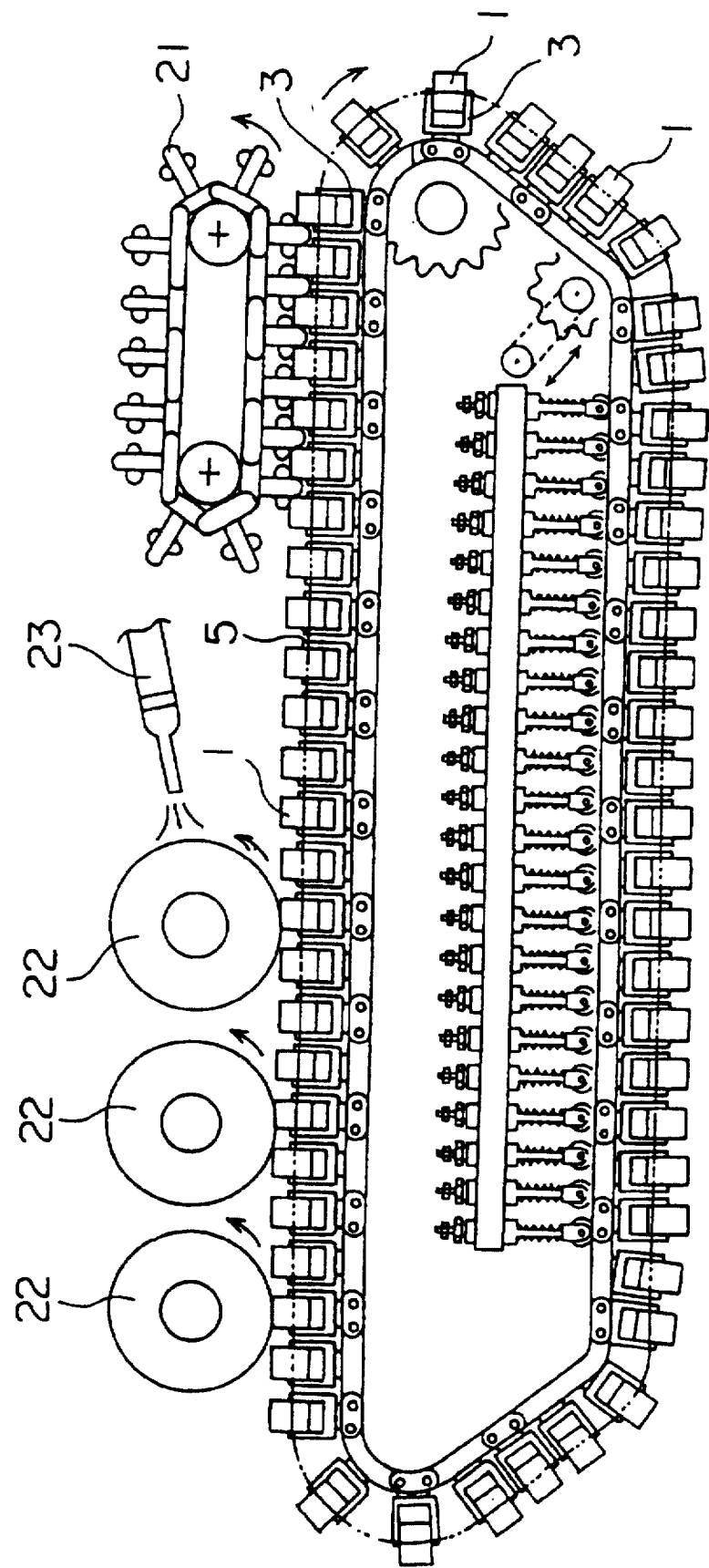
FIG. 19 is another modification of an endless track magnetic traveling device (corresponding to in FIG. 4) of the invention.

In the traveling device shown in FIG. 19 having a mechanism for reducing the temperature of the traveling device even if the temperature of the traveling surface 60 is high, a crawler 21 of an endless belt which engages in the gaps between the adjoining chain 5 of the endless track is provided so as to cool the magnets I of the endless track contacting the crawler 21.

FIG. 19 also shows an arrangement having a plurality of heat discharge rollers 22 for cooling the magnets 1 of the endless track and an air nozzle 23 for cooling the heat discharge rollers 22. In this case, the magnets 1 of the endless track are subsequently allowed to contact the plurality of heat discharge rollers 22 so as to cool the magnets 1.

To reduce a magnetic flux density of the traveling device to be leaked out from the traveling surface 60, the entire endless track is covered with magnetic material or may be covered with a cover made of a combination of high magnetically permeable material and low magnetically permeable material except for the portion where they are attracted to the traveling surface 60.

Figure 20:
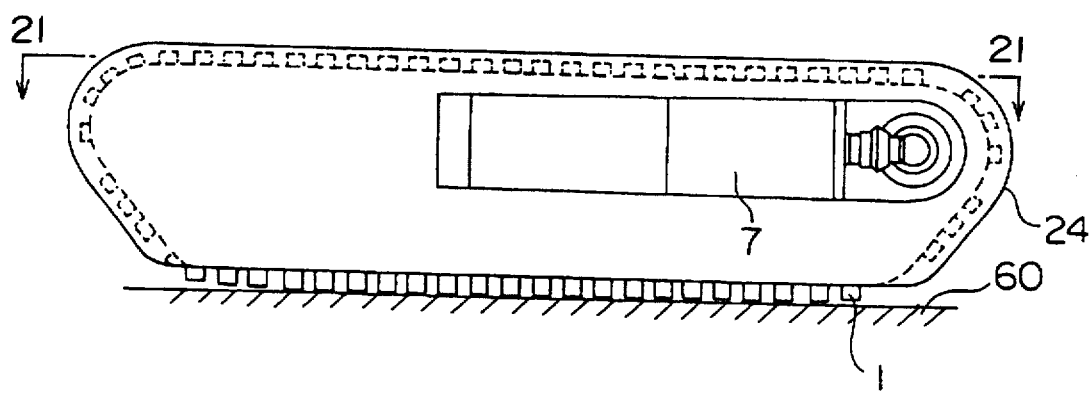
FIG. 20 is a side view showing an external appearance of an endless track magnetic traveling device according to a further modification of the invention.
Figure 21:
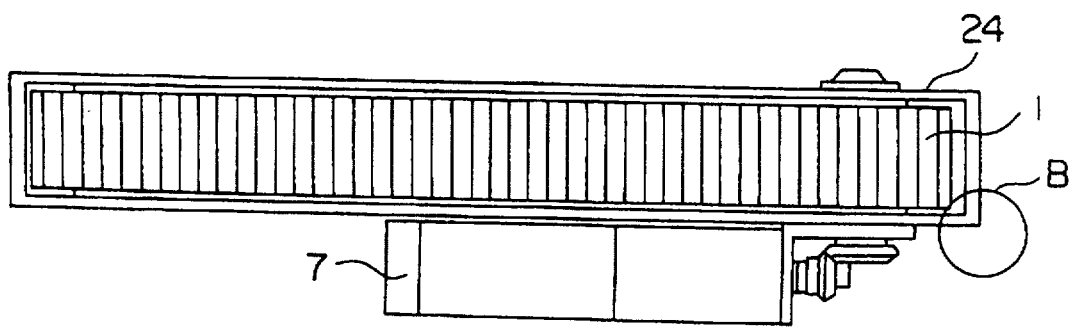
FIG. 21 is a cross sectional view taken along line A—A of FIG. 20.

For example, as shown in FIG. 21, which is taken along the line A—A in FIG. 20 showing the side view of the traveling device, the portions other than the traveling portion of the traveling device are covered with a magnetic cover 24. In the example shown in FIGS. 20 and 21, the magnetic cover 24 also serves as the side plates 13 in FIG. 1.

Figure 22:
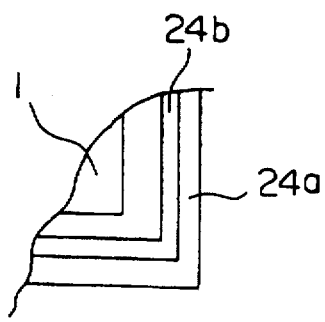
FIG. 22 is an enlarged view as denoted by an extension line B.

If the magnetic cover 24 is formed of magnetic material such as a sheet of iron, magnetism to be leaked outside is reduced since the magnetic cover 24 forms a magnetic circuit. Further, as shown in FIG. 22 which enlarges a circle denoted by an extension line B in FIG. 21, magnetic flux is less leaked outside if the magnetic cover 24 is formed by a lamination layer composed of a magnetic cover 24a formed of high magnetically permeable material, and a magnetic cover 24b formed of low magnetically permeable material.

If the traveling device of the present invention is troubled and not moved, the traveling device needs to be removed from the traveling surface 60 to which the magnets 1 of the endless track are attracted strongly. Accordingly, the traveling device can be structured to have heating bodies such as heaters to be fixed to the peripheries of magnets 1. In such a manner, the heaters are operated to heat the magnetic portion above the Curie temperature, when the traveling device is troubled, so as to deprive the magnetic force of the magnets 1, whereby the traveling device is removed from the traveling surface 60 and it is collected.

Figure 23:
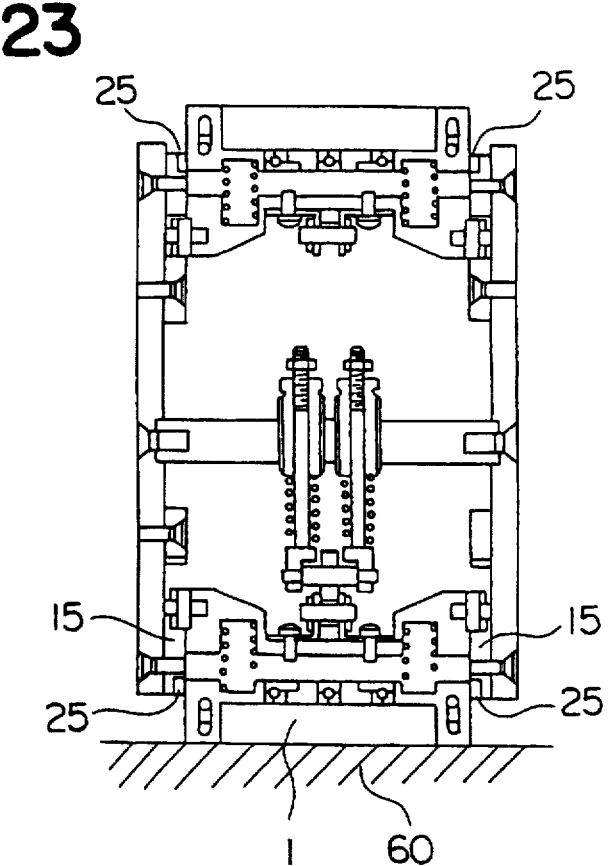
FIG. 23 is a still further modification of an endless track magnetic traveling device (corresponding to a cross sectional view taken along the line B—B in FIG. 4) of the invention.
Figure 24:
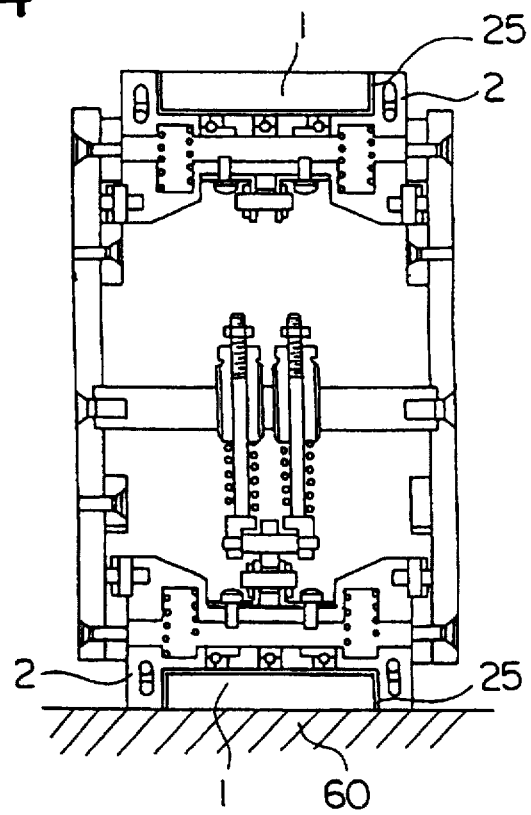
FIG. 24 is a modification of an endless track magnetic traveling device (corresponding to a cross sectional view taken along the line B—B in FIG. 4) of the invention.

FIG. 23 (modification of the traveling device taken along the line B—B in FIG. 4) shows an example of the traveling device wherein the heaters 25 are fixed to the outside stroke adjusting plates 15, and FIG. 24 (modification of the traveling device taken along the line B—B in FIG. 4) shows an example of the traveling device wherein the heaters 25 are fixed to the magnet receivers 2.

Figure 25:
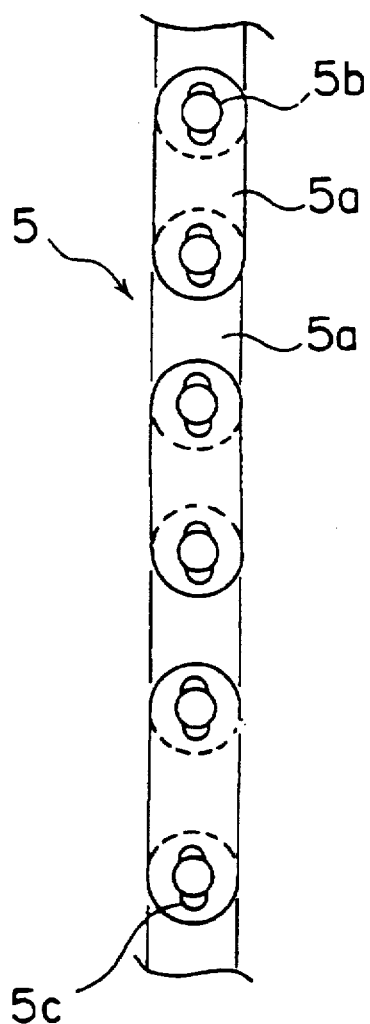
FIG. 25 is a view showing a modification of a chain of an endless track magnetic traveling device of the invention.
Figure 26:
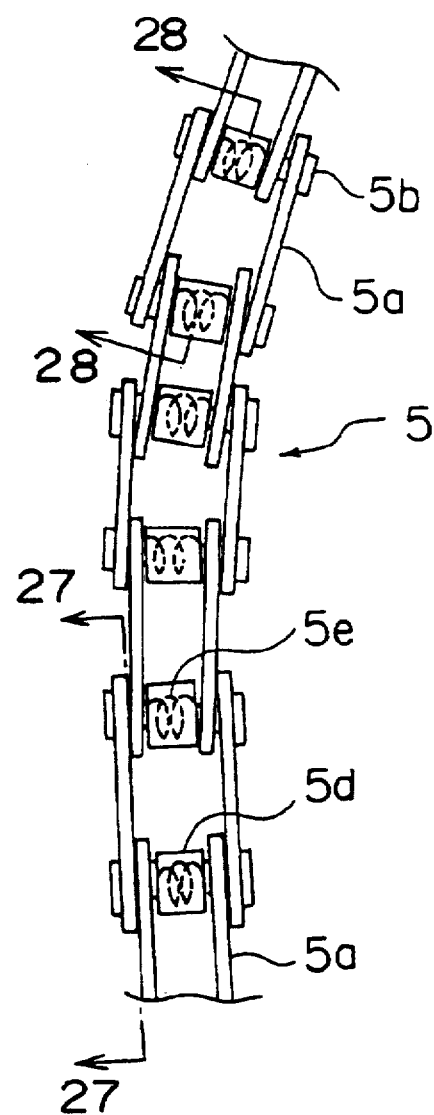
FIG. 26 is a plan view of FIG. 25.
Figure 27:
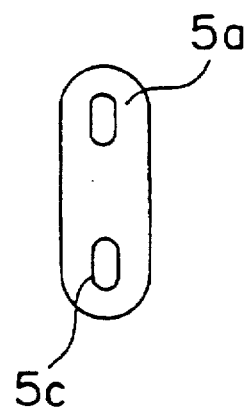
FIG. 27 is a cross sectional view taken along line A—A in FIG. 26.
Figure 28:
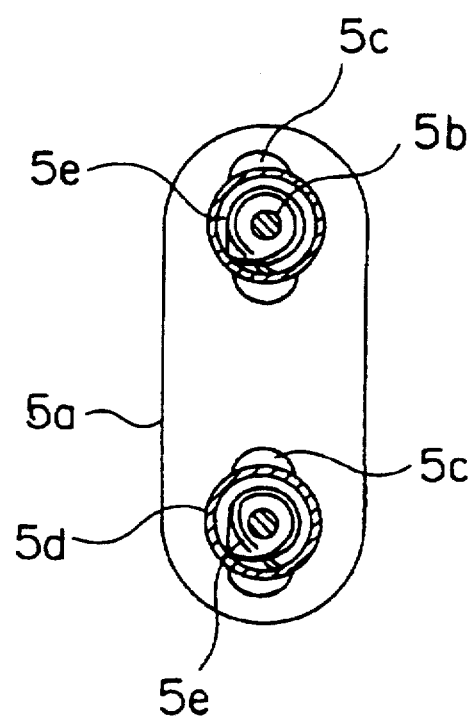
FIG. 28 is a cross sectional view taken along line B—B in FIG. 26.

FIGS. 25 through 28 show modifications of the chain 5 of the endless track magnetic traveling device having a flexible structure. FIG. 25 is a side view of the chain 5, FIG. 26 is a plan view of the chain 5, FIG. 27 is a view taken along the line A—A in FIG. 26 and FIG. 28 is a view taken along the line B—B in FIG. 26.

Holes 5c of chain side plates 5a through which coupling shafts 5b are inserted are bored to form long holes each having a major axis larger than the diameter of each coupling shaft 5b. Each coupling shaft 5b has a collar at both ends thereof for preventing it from coming off each side plate. The coupling shaft 5b are inserted into long holes 5c of the chain side plates 5a. There are provided between the chain side plates 5a pitch adjusting collars 5 d for adjusting pitches between the chain side plates 5a and springs 5 e for moving two chain side plates 5a outward wherein the spring 5e is positioned inside the pitch adjusting collars 5d.

Accordingly, the coupling shafts 5b inserted into the long holes 5c of the chain side plates 5a slightly move inside the long holes 5c so that the neighboring chain side plates 5a do not interfere with one another in the traveling direction even if the traveling device travels in the curved direction, for example, when it is turned, and each interval between the chain side plates 5a can be adjusted by the width of each pitch adjusting collar 5d owing to elasticity of the springs 5e.

FIGS. 29 through 45, FIGS. 46 and 47 respectively show modifications of the traveling device which have flexible structures.

Figure 29:
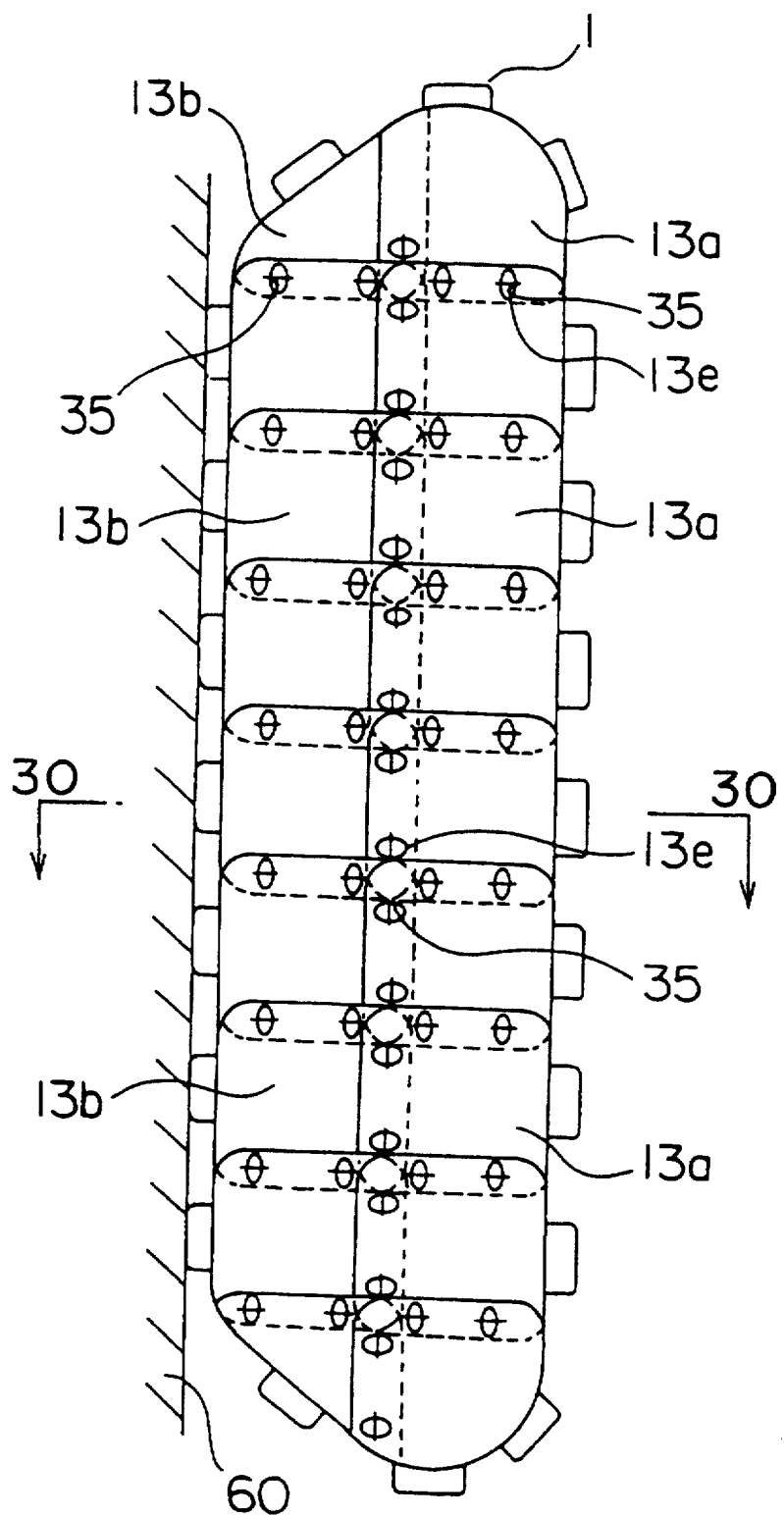
FIG. 29 is a view showing a modification of a side plate of an endless track magnetic traveling device.
Figure 30:
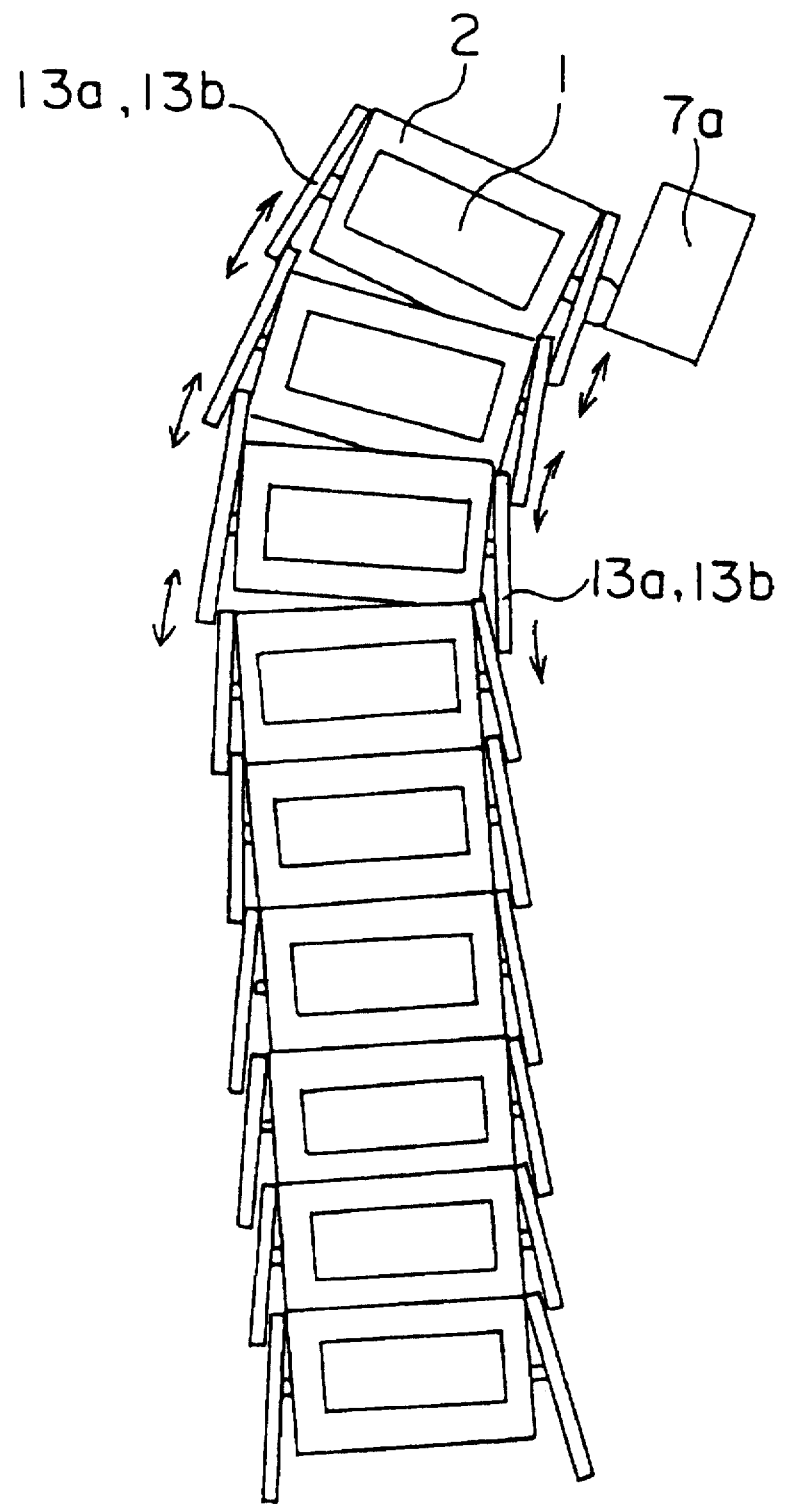
FIG. 30 is a plan view of the traveling device in FIG. 29.

FIG. 29 (side view of the traveling device) and FIG. 30 (plan view of the traveling device) show schematic views each having a structure in which a plurality of small side plate pieces are coupled with one another by each loose coupling mechanism instead of two side plates 13 which clamp the endless track in FIG. 1, and FIGS. 31 through 34 are concept views explaining the turning operation of the traveling device comprising an endless track which is provided at both sides of the coupling device.

A plurality of small side plate pieces comprise upper side plates 13a, lower side plates 13b, pins 35 inserted into long holes 13e defined in the upper and lower side plates 13a and 13b, wherein the upper and lower side plates 13a and the 13b are loosely coupled with one another by the pins 35. Further, the upper side plates 13a and 13a, and the lower side plates 13b and 13b which respectively adjoin one another in the traveling direction are respectively loosely coupled with one another by the pins 35 which are inserted into the long holes 13e and 13e respectively defined in the upper side plates 13a and the lower side plates 13b.

With such an arrangement, the upper side plates 13a and the lower side plates 13b, and those which adjoin one another in the traveling direction are respectively coupled by each loose coupling mechanism, thereby forming the flexible side plates 13 as a whole by the entire upper side plates 13a and the lower side plates 13b. As a result, the traveling direction of the traveling device can be easily performed by an external force.

The turning operation of the endless track magnetic traveling device will be now described with reference to FIGS. 31 through 34.

Since the chain 5 constituting the endless track has the flexible structure, force for bending the endless track along the leading side plates 13a and 13b acts upon the magnets I by the guide wheels 16 (see to FIG. 40) fixed to the magnet holder 3 depending on turning angles of the upper side plates 13a and the lower side plates 13b. On the other hand, although the endless track is strongly attracted to the traveling surface 60 (see to FIG. 40) by the magnets 1, the magnets 1, which are newly supplied in the traveling direction when traveling, are attracted to the traveling surface 60 at turning positions relative to the traveling direction by the turning angles which are given by a front handle 33. This turning models are shown in FIGS. 31 through 34. When the traveling device comprising endless tracks A and B which are arranged in parallel with each other and coupled by a vehicle body 31 of a coupling device 30 makes a turn as shown in FIG. 31 (showing side views of the endless track portions of the traveling device and views taken along the line B—B of the same side views), the traveling device can perform the turning operation by delaying the traveling speed of the inner side endless track A and quickening the traveling speed of the outer side endless track B when it turns while the inner side endless track A is positioned at the inner radius since the endless tracks A and B can be controlled independently in their operating speeds and turning angles. Numerals in the endless tracks A and B in FIG. 31 represent moving positions of the magnets 1 when the traveling device moves forward.

Figure 32:
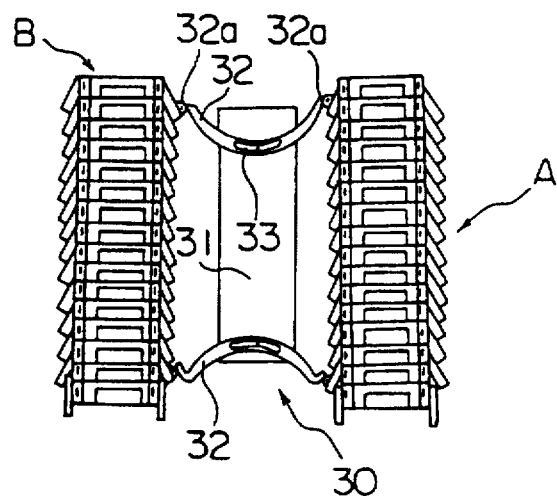
FIG. 32 is a view for explaining a manner of turning of a flexible endless track magnetic traveling device according to the invention.
Figure 33:
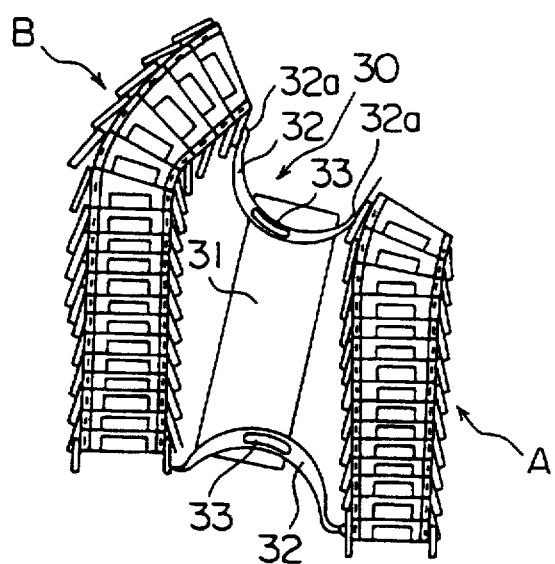
FIG. 33 is a view for explaining a manner of turning of a flexible endless track magnetic traveling device according to the invention.

Meanwhile, when the traveling device turns, the endless track portion having the magnets 1 which are attracted to the traveling surface 60 does not tend to move so that the endless tracks A and B and the vehicle 31 body interfere with one another. Accordingly, as shown in FIGS. 32 and 33, arms 32, which couple the endless tracks A and B at the inner tip end portion and rear end portion thereof, are attached to the vehicle body 31, and the handles 33 are provided on the arms 32. In this case, if the handles 33 are turned in the turning direction as shown in FIG. 33, the traveling device can turn about a fulcrum 32 a of the arms 32, at the inner tip end portion. At this time, the inner side endless track A turns by a small amount in such a manner that it moves forward after it moves backward once and the outer side endless track B turns by a large amount.

Figure 34:
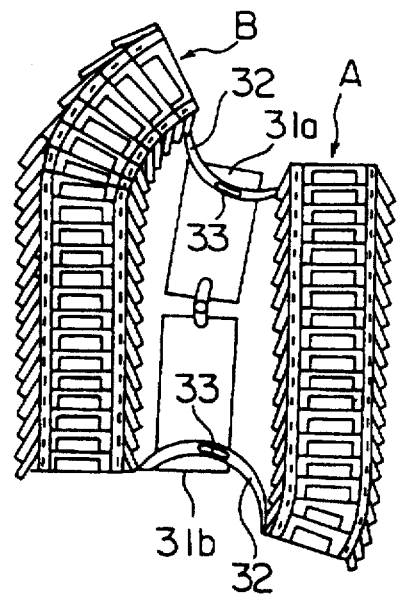
FIG. 34 is other modification of a flexible endless track magnetic traveling device according to the invention.

Further as shown in FIG. 34, the vehicle body 31 is divided into a vehicle body 31 a and a vehicle body 31 b which are coupled to each other so that the vehicle body 31 can turn easily without interfering with the endless tracks A and B.

Still further, if the vehicle body 31, not shown, is structured to position over the endless track A or B, it can turn without interfering with the endless track A or the endless track B.

Described hereinafter with reference to FIGS. 35 to 45 are concrete examples of the traveling device comprising the endless tracks composed of the chain 5 formed of the loose coupling mechanism or system and the side plates 13 which are divided into small pieces and are loosely coupled with one another, wherein the endless tracks are arranged in parallel with each other.

Figure 35:
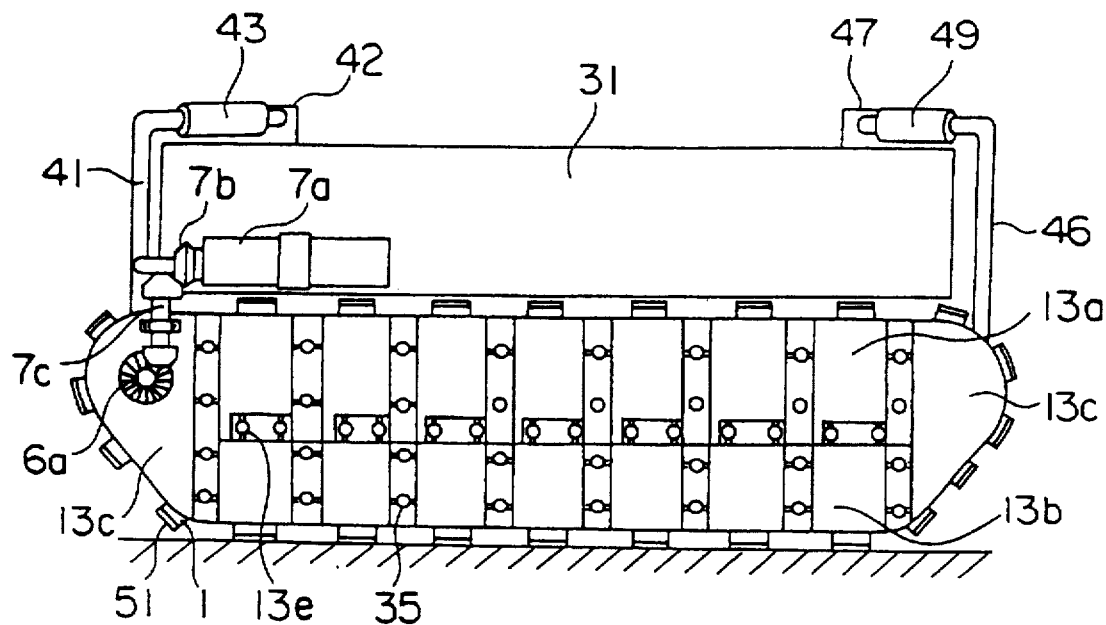
FIG. 35 is a side view of the flexible endless track magnetic traveling device according to the invention.
Figure 36:
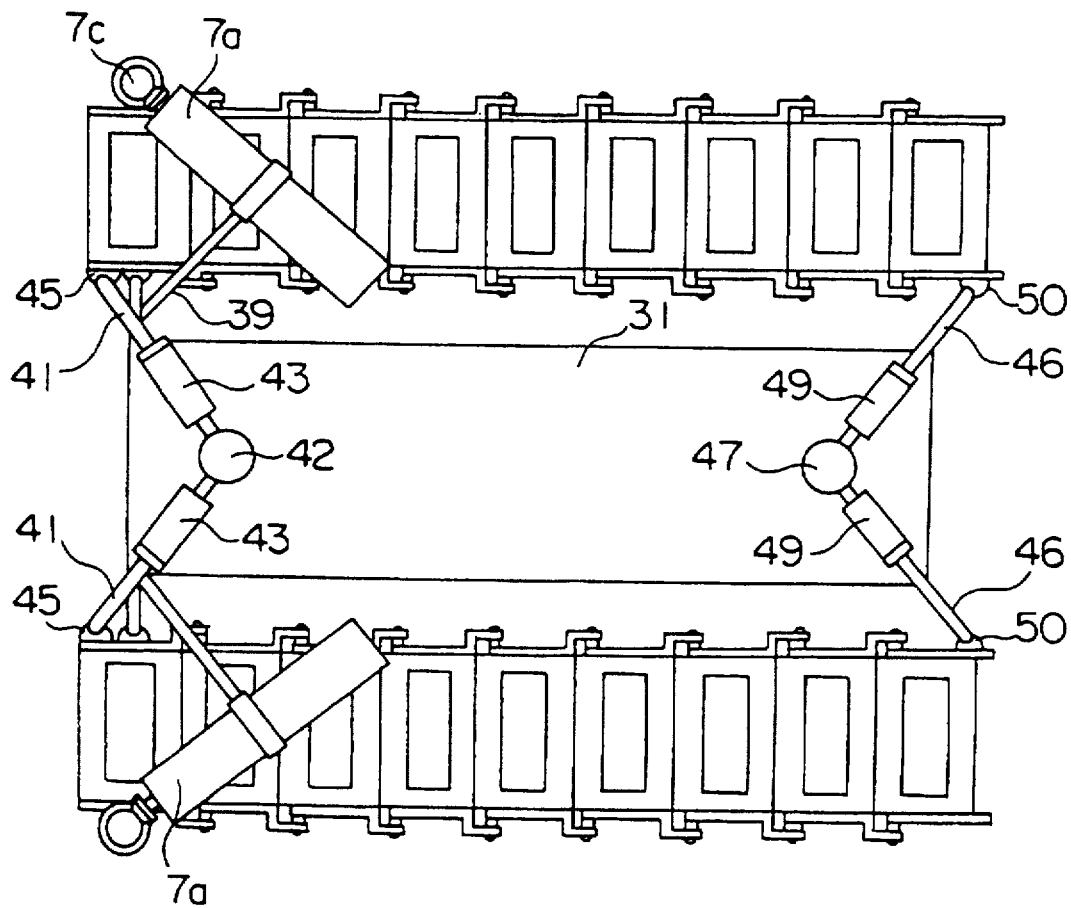
FIG. 36 is a plan view of the flexible endless track magnetic traveling device in FIG. 35.
Figure 38:
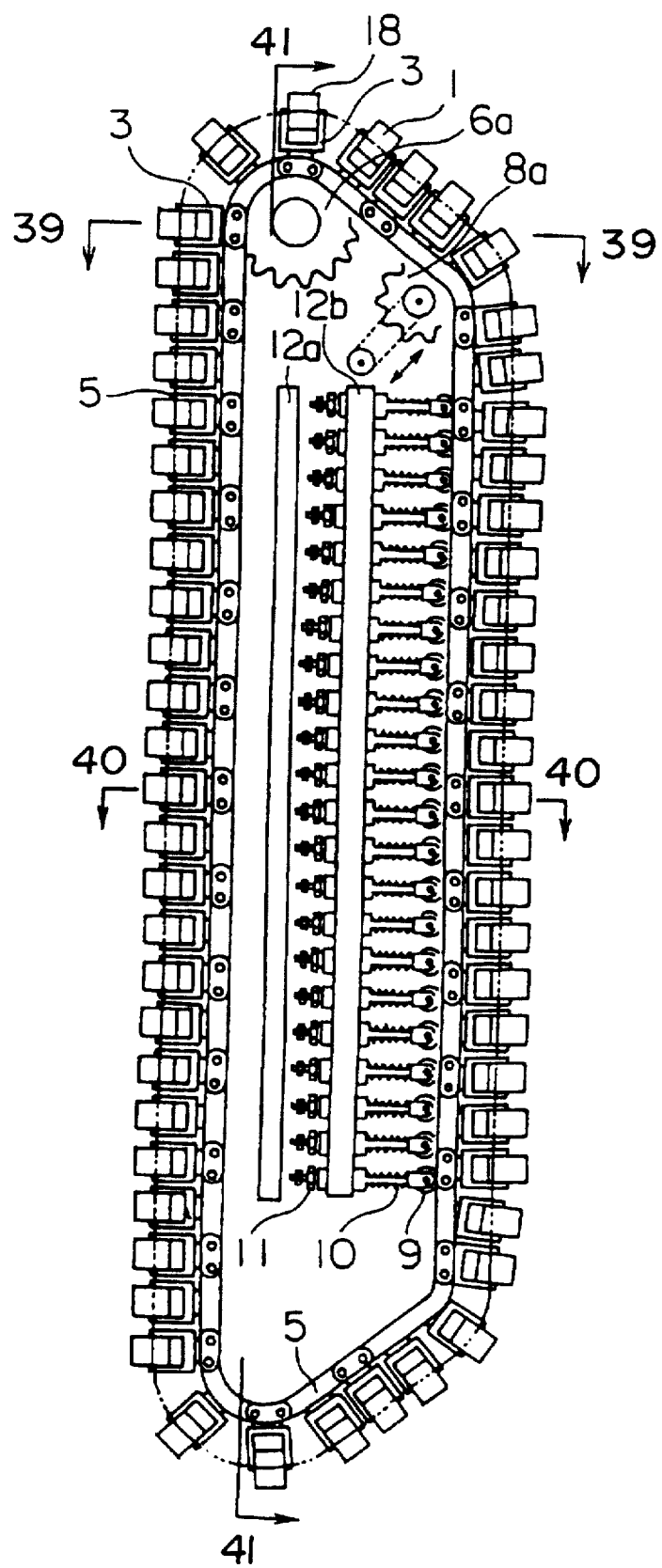
FIG. 38 shows an internal structure of the flexible endless track magnetic traveling device in FIG. 35 removing a side plate portion.
Figure 39:
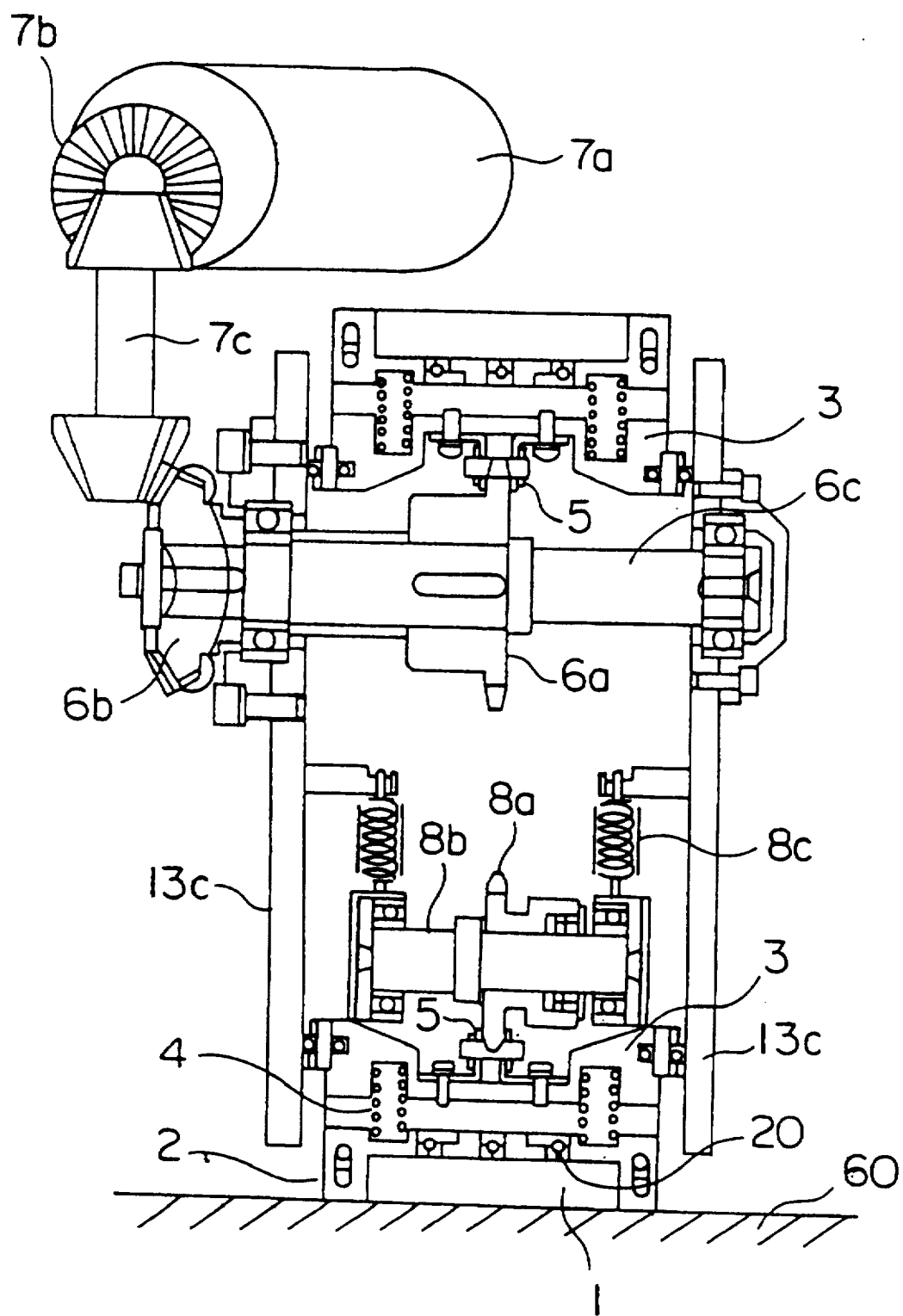
FIG. 39 is a cross sectional view taken along line A—A in FIG. 38.
Figure 40:
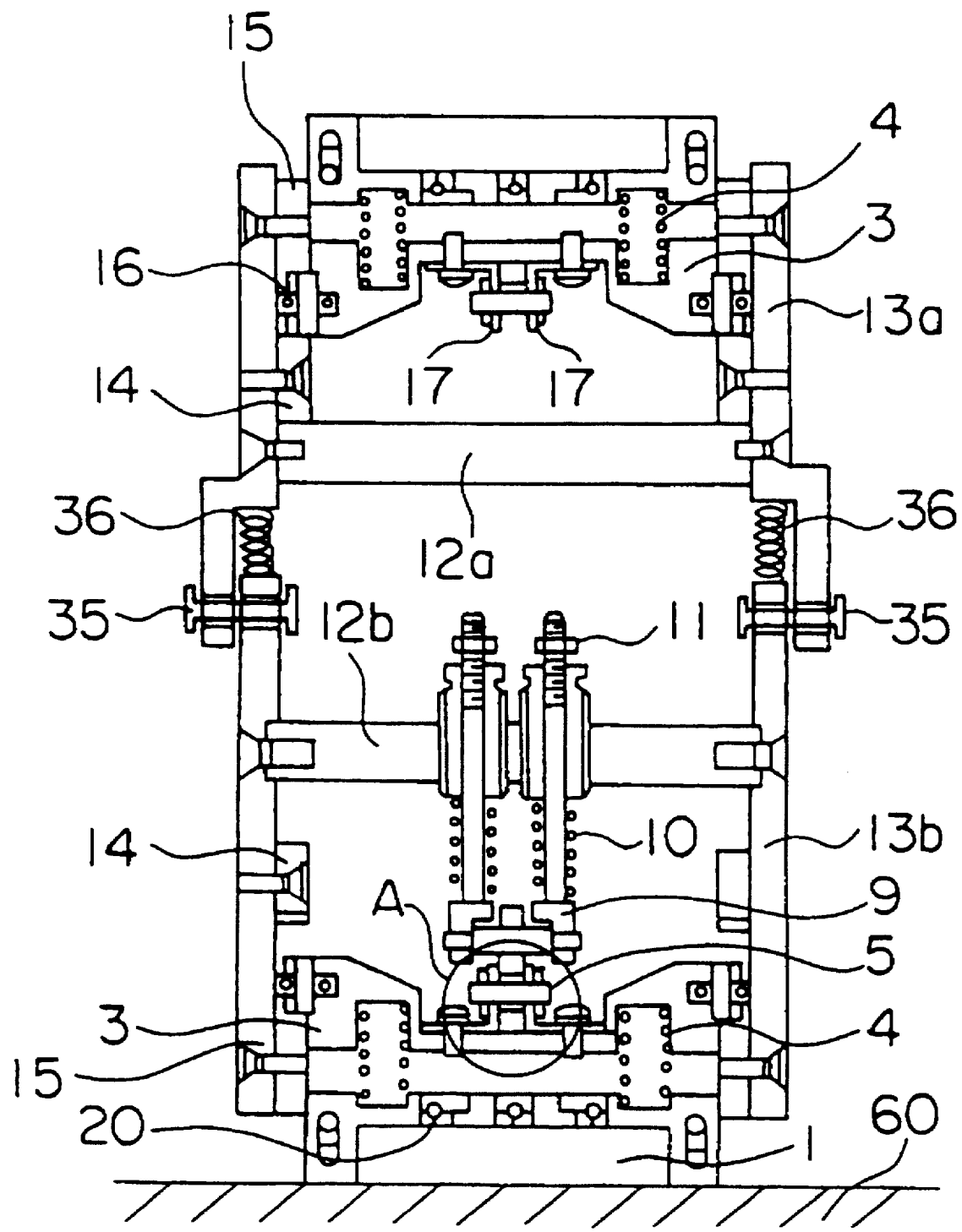
FIG. 40 is a cross sectional view taken along line B—B in FIG. 38.
Figure 41:
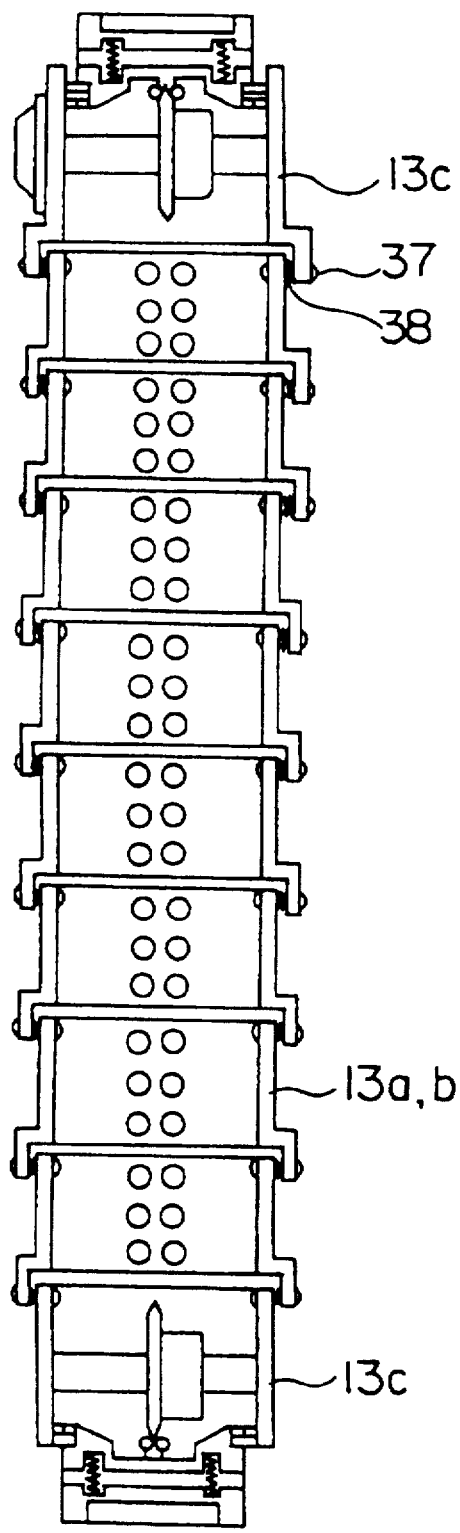
FIG. 41 is a cross sectional view taken along line C—C in FIG. 38.
Figure 42:
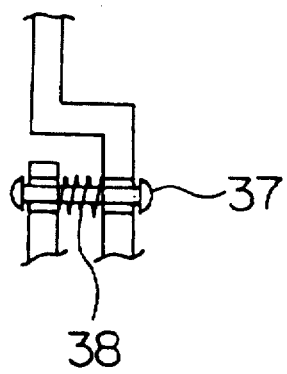
FIG. 42 is an enlarged view of coupling portions between the side plates when viewed from the front and rear directions of the flexible endless track magnetic traveling device shown in FIG. 41.
Figure 43:
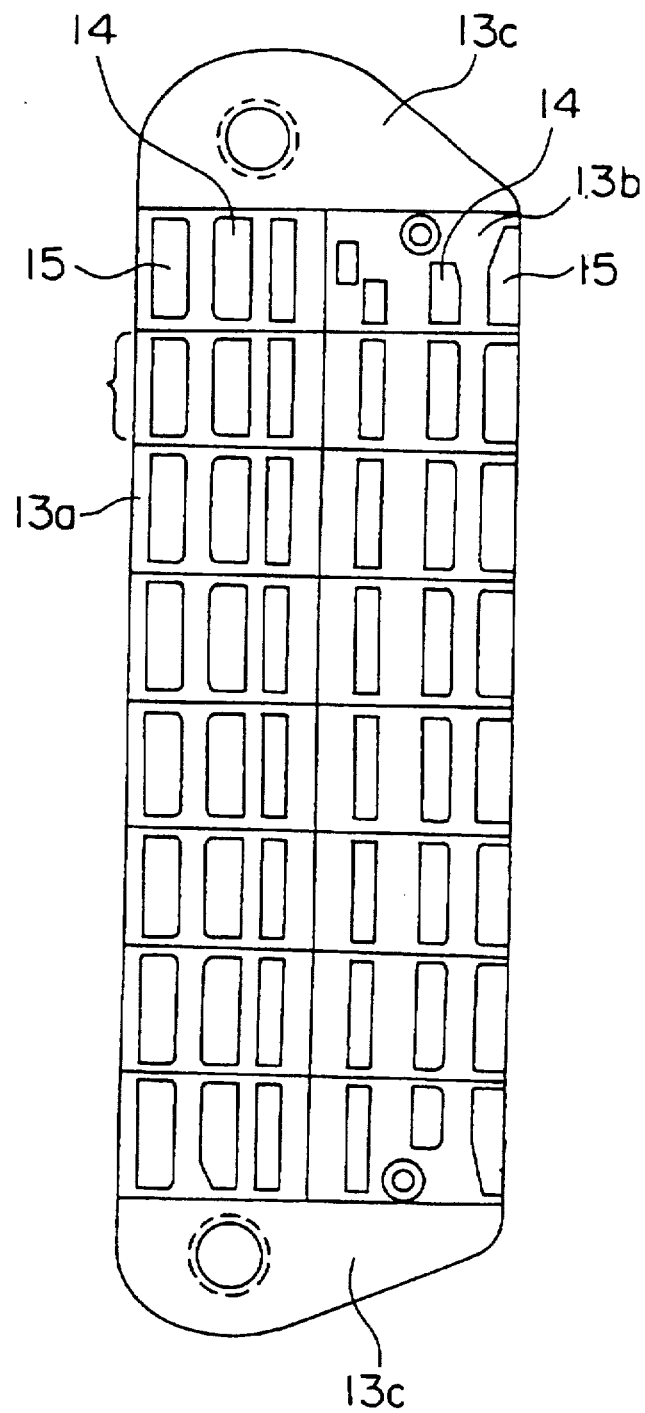
FIG. 43 is a side view of the side plate when viewed from the inside of the flexible endless track magnetic traveling device in FIG. 38.

FIG. 35 is a side view of the traveling device, FIG. 36 is a plan view of the traveling device and FIG. 37 is a front view of the traveling device. FIG. 38 shows an internal structure of the traveling device removing the side plates 13, FIG. 39 is a view of a flexible traveling device taken along the line A—A in FIG. 38, FIG. 40 is a view taken along the line B—B in FIG. 38, FIG. 41 is a view taken along the line C—C in FIG. 38, and FIG. 42 is a view enlarging a coupling portion for coupling the side plates when viewed from the front and rear portions of the traveling device, FIG. 43 is a plan view of the side plate when viewed from the inner side thereof, FIG. 44 is a bird's eye view showing a coupling portion between the upper and lower side plates, and FIG. 45 is a view taken along the line B—B in FIG. 38 showing a state where the traveling device gets over the uneven spot 60a of the traveling surface 60.

In each of these figures, components performing the same function as those which constitute the traveling device as explained in the first embodiment are denoted by the same numerals and the explanations thereof are omitted.

Although the side plates of the traveling device comprise the upper side plates 13a and the lower side plates 13b which are coupled with one another, the side plates 13c at the forefront and the rearmost portions of each endless track are not divided into upper and lower portions which are indifferent from the side plates divided into upper and lower portions as shown in FIG. 29.

Figure 44:
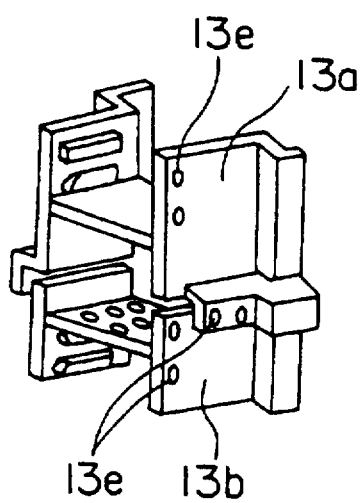
FIG. 44 is a bird's eye view of a coupling portion between upper and lower side plates of the flexible endless track magnetic traveling device in FIG. 29.
Figure 45:
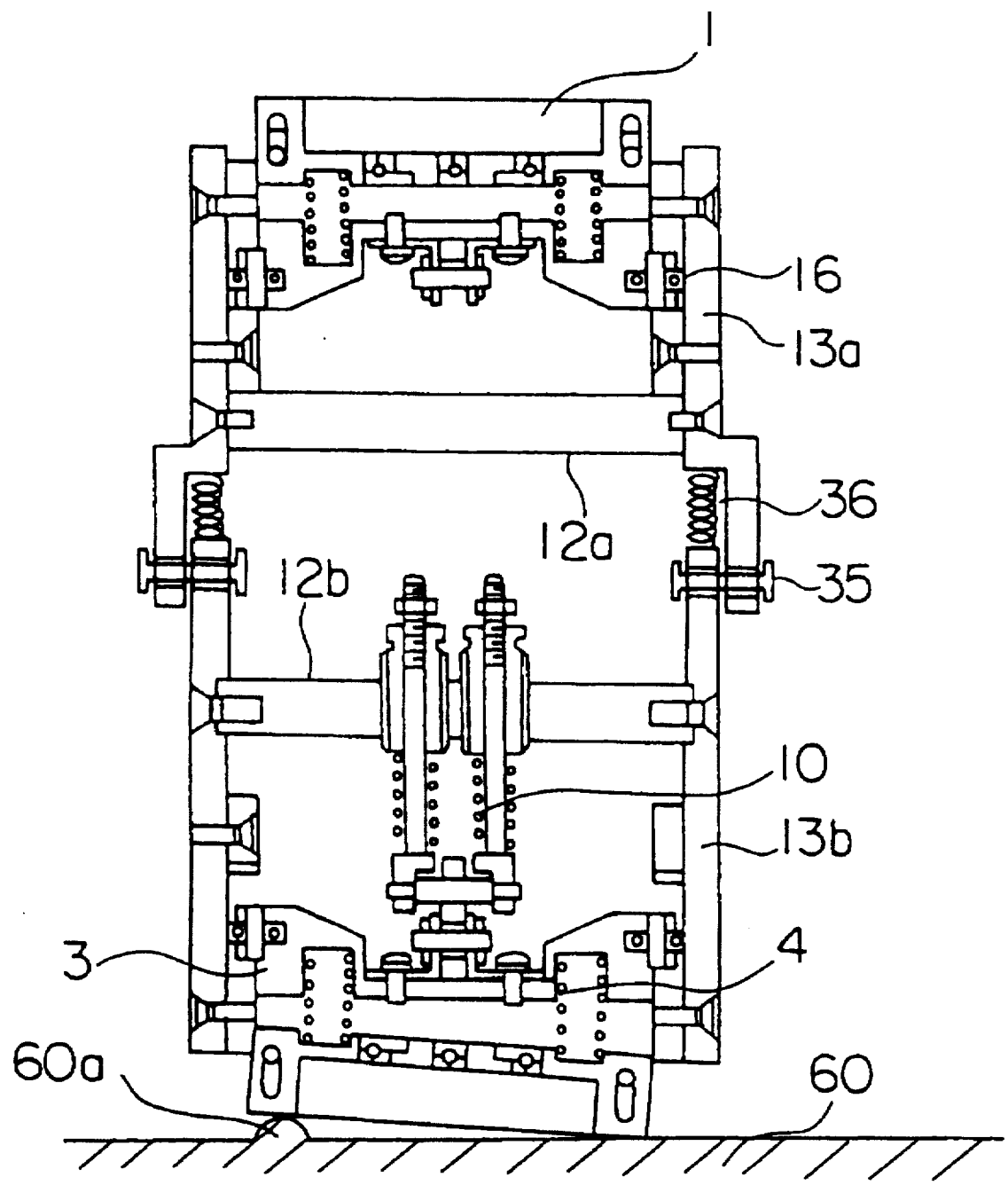
FIG. 45 is a plan view (taken along line B—B in FIG. 38) of a side plate when viewed from the inner side of the side plate of the flexible endless track magnetic traveling device in FIG. 38.

Further, as shown in FIG. 44, the coupling between the upper side plates 13a and the lower side plates 13b is made by bending the lower end portions of the upper side plates 13a to form bent portions in a cross section and loosely coupling between the side surfaces of the bent portions of the upper side plate 13a and those of the upper end portions of the lower side plates 13b by the pins 35 (FIG. 40) inserted into the long holes 13e, and then interposing springs 36 (FIG. 40) between the bent portion of the upper side plates 13a and the upper end portions of the lower side plates 13b. The couplings between the neighboring upper side plates 13a and the lower side plates 13b are made by bending the rear end portions of the upper side plates 13a and the lower side plates 13b to form bent portions, and the side surfaces of the front end portions of the rear side plates 13a and 13b are coupled by pins 37 inserted into the long holes 13e, and springs 38 are provided on the pins 37 (FIGS. 41 and 42).

As shown in FIG. 39, the driving wheel 6a with a gear meshing with the flexible chain 5 of the endless track is integrally attached to the rotary shaft 6c which is supported by the leading side plate 13c while penetrating the side plate 13c. The driving wheel 6b with a bevel gear is attached to one end of the rotary shaft 6c which extends outward from one side plate 13c, and the driving wheel 6b meshes with an intermediate bevel gear 7c at the side of the motor 7a. The intermediate bevel gear 7c meshes with the intermediate bevel gear 7b fixed to the rotary shaft of the motor 7a which is provided on a wall surface of the vehicle body 31 by way of a motor support 39 (FIG. 36), and transmits the driving force of the motor 7a to the rotary shaft 6c so that the turning effort of the rotary shaft 6c is transmitted to the chain 5 by way of the driving wheel 6a.

Although the pair of driving wheels 6a each provided with gears and the pair of idler wheels 8a provided with gears form the trapezoidal track along the peripheries of the upper and lower side plates 13a, 13b and 13c including the flexible chain 5, etc., the springs 10 have function to press the auxiliary wheels 9 against the flexible chain 5 of the endless track, namely, pressing the auxiliary wheels 9 each provided with springs against the short side of the endless track from the inside of the traveling device, wherein the springs 10 are pressed against a supporting beam 12b at one ends thereof for supporting the lower side plates 13b at one end thereof.

The upper side plates 13a at both sides are integrally fixed to both ends of a supporting beam 12a (FIGS. 38 and 40). The upper and lower side plates 13a and 13b, and front and rear plates 13c are respectively coupled by pins 35 in the traveling direction (front and rear directions) of the crawler.

As shown in FIGS. 35 through 37, front steering linkages 41 extend and contract actuators 43 coupled to a fulcrum 42 provided on the vehicle body 31 so as to operate the foremost front side plate 13c by way of steering supports 45, thereby steering the traveling device. Further, rear steering linkages 46 extend and contract actuators 49 coupled to a fulcrum 47 provided on the vehicle body 31 so as to operate the rearmost side plate 13c by way of steering supports 50.

The traveling operation of the traveling device having the aforementioned arrangement will be now described. Although the magnets 1 constituting the endless tracks formed of magnetic material are attracted to the traveling surface 60, if the force for driving the endless tracks comprising the flexible chain 5 by the motor 7c is made greater than the attraction of the magnets 1, the magnets 1 move away from the traveling surface 60, and then the traveling device travels in the same manner as the embodiment as shown in FIG. 4, namely, the traveling structure of the traveling device is the same as the embodiment in FIG. 4. Since the plurality of auxiliary wheels 9 each having the spring which are provided in parallel with one another press the flexible chain 5 of the endless track, the magnets 1 can be surely attracted to the traveling surface 60.

Even if there is the uneven spot 60a on the traveling surface 60, the operation of each magnet 1 is transmitted to the supporting beam 12b by way of the springs 4, the magnet holder 3, the auxiliary wheels 9 and the springs 10. Further, the operation of the supporting beam 12 b and the lower side plates 13b are transmitted to the upper side plates 13a and the supporting beam 12a by way of the pins 35. At this time, as shown in FIG. 45, even if there is the uneven spot 60a positioned locally on the traveling surface 60, the springs 36 are provided between the upper side plates 13a and the lower side plates 13b, and the operation of traveling device in the direction of height of the uneven spot 60a of the traveling surface 60 is absorbed by three springs 4, 10 and 36. In such a manner, the operation of the traveling device in the direction of height of the uneven spot 60a of the traveling surface 60 is more easily absorbed than that in FIG. 4.

Next, the turning operation of the endless track will be now described.

When the front steering linkages 41 are operated to extend or contract the actuators 43 coupled to the fulcrum 42 as shown in FIGS. 35 through 37 so as to operate the foremost side plate 13c by way of the steering supports 45, thereby steering the traveling device. Since the chain 5 constituting the endless track has the flexible structure, the force for turning the endless track acts upon the magnets 1 by the guide wheels 16 attached to the magnet holder 3 following the front side plates 13c. The side plates 13a, 13b and 13c are divided into small segments in the traveling direction and the vertical direction, and they are loosely coupled with one another by the pins 35 and 37, and the springs 36 and 38. As a result, the turning force of the front steering linkages 41 acts upon the front side plates 13c alone and gentle turning force is applied to the side plates 13a through 13c other than the front side plates 13c by way of the pins 35 and 37, and the springs 36 and 38.

Meanwhile, although the endless track is strongly attracted to the traveling surface 60 by the magnets 1, the magnet 1 to be newly supplied in the traveling direction is attracted to the traveling surface 60 at a turning position by a turning angle which is applied to the front steering linkages 41. This model is illustrated in FIGS. 31 through 33. That is, the succeeding magnet 1 is attracted to the traveling surface 60 at a location which is turned likewise relative to the traveling direction thereof with a given turning angle with respect to the magnet 1 which is attracted to the traveling surface 60 with a new turning angle relative to the traveling direction thereof. The traveling device can travel along the endless tracks A and B with such continuous operations. Accordingly, since the vehicle body 31 turns by way of the front steers 41, the vehicle body 31 per se can curve finally. Further, the rear steers 46c an be also steered in the same manner as the previous means.

When the endless tracks turn, there occurs curvature difference between the inner and outer endless tracks A and B when the traveling device turns as a whole since the endless tracks are provided at the right and left of the vehicle body 31. Accordingly, to solve the problem of the curvature difference, a pair of endless tracks A and B which are arranged in parallel with each other are respectively needed to turn with a given turning radius relative to a turning radius (R) of the traveling device. For example, supposing that the R=500 mm in the case of the right turning, and an interval between the endless tracks which are arranged in parallel with each other is 200 mm, the inner endless track A has a turning radius R1=500 mm and the outer endless track B has a turning radius R2=700 mm.

Each of the turning radiuses R1 and R 2 of the inner and outer endless tracks A and B can be changed first by independently changing extension and contraction coefficients of the actuators 43, by changing the traveling speed depending on curvatures of the turning radiuses of respective endless tracks, and also by changing the traveling directions of respective endless tracks.

Meanwhile, since the magnets 1 neither turn nor slide while they are attracted to the traveling surface 60, the surface of the traveling surface 60 is not damaged. Particularly, if a rubber 51 is stuck to the magnets 1 at portions where they contact the traveling surface 60 (see to FIG. 35), the effect can be increased.

Figure 46:
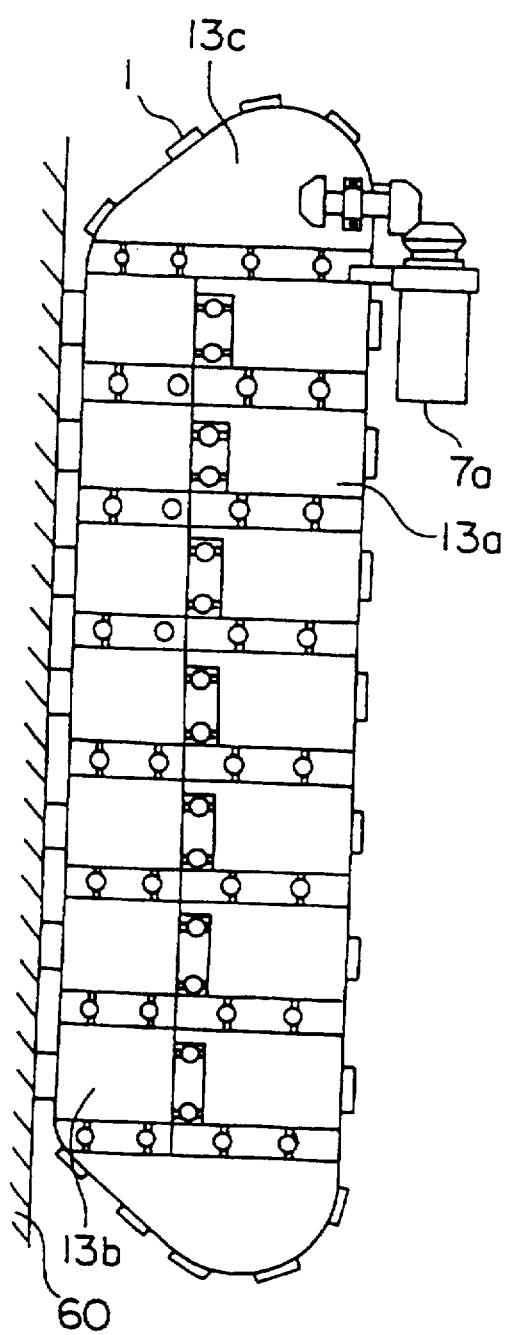
FIG. 46 is a side view of a single flexible endless track magnetic traveling device of the invention.
Figure 47:
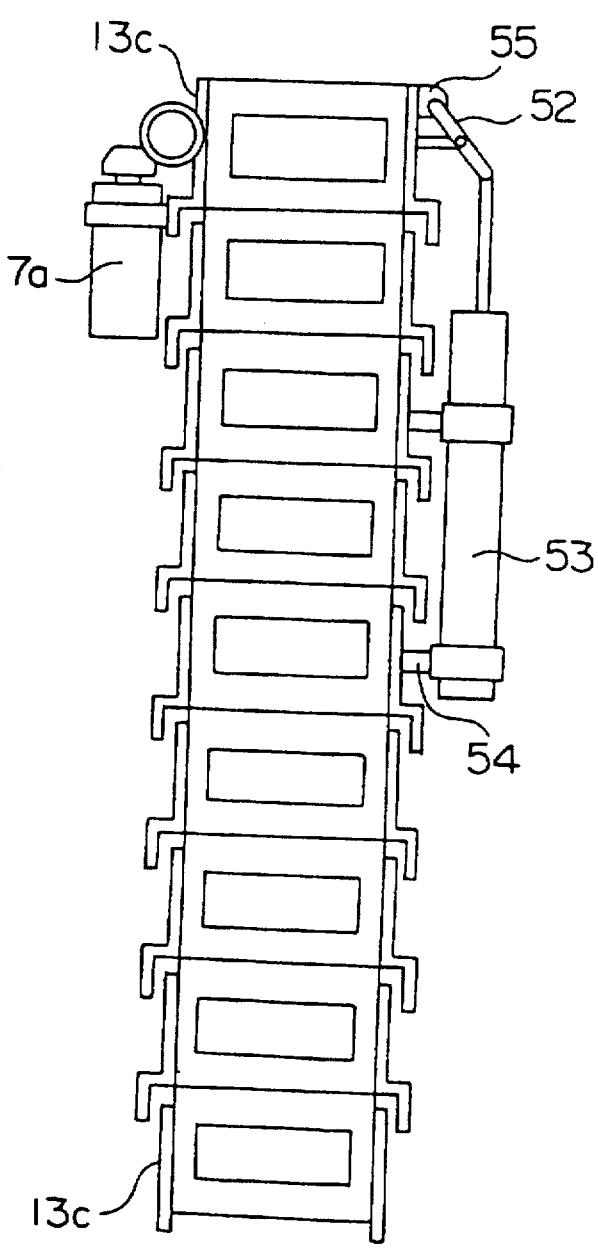
FIG. 47 is a plan view of the traveling device of FIG. 46.

FIG. 46 (side view) and FIG. 47 (plan view) respectively show a steering structure of the traveling device comprising a single flexible endless track. The motor 7a, a steering linkage 52, an actuator 53 are attached to the foremost side plate 13c by way of a stretchable support 54', and a steering support 55' and the motor 7a are attached to the side plate 13c. When the actuator 53 is extended or contracted, the force involved thereby is transmitted to the stretchable support 54' to thereby turn the side plate 13c. As a result, the single endless track can travel while turning.

As mentioned above, in FIGS. 25 through 47, an interference between the chains 5 and an interference between the side plates 13 are respectively reduced by allowing the chain 5 and the side plates 13 to be flexible so that the traveling device can smoothly turn. Accordingly, the sliding between the traveling surface 60 and the magnets 1 is hardly generated when the traveling device turns, and further, the damage of the traveling surface 60 owing to friction between the traveling surface 60 and the magnets 1 can be prevented, and therefore traveling device can easily get over the uneven spot 60a of the traveling surface 60.

Still further, if the elastic member 51 such as rubber is employed by a part of the magnets 1 of the endless track, the frictional coefficient between the traveling surface 60 and the magnets 1 is increased so that the traveling device hardly slides, and can travel safely even on the perpendicular wall surface.

Still further, the flexible endless tracks can travel independently, and the traveling device can be used by combining and assembling a plurality of endless tracks.

Figure 48:
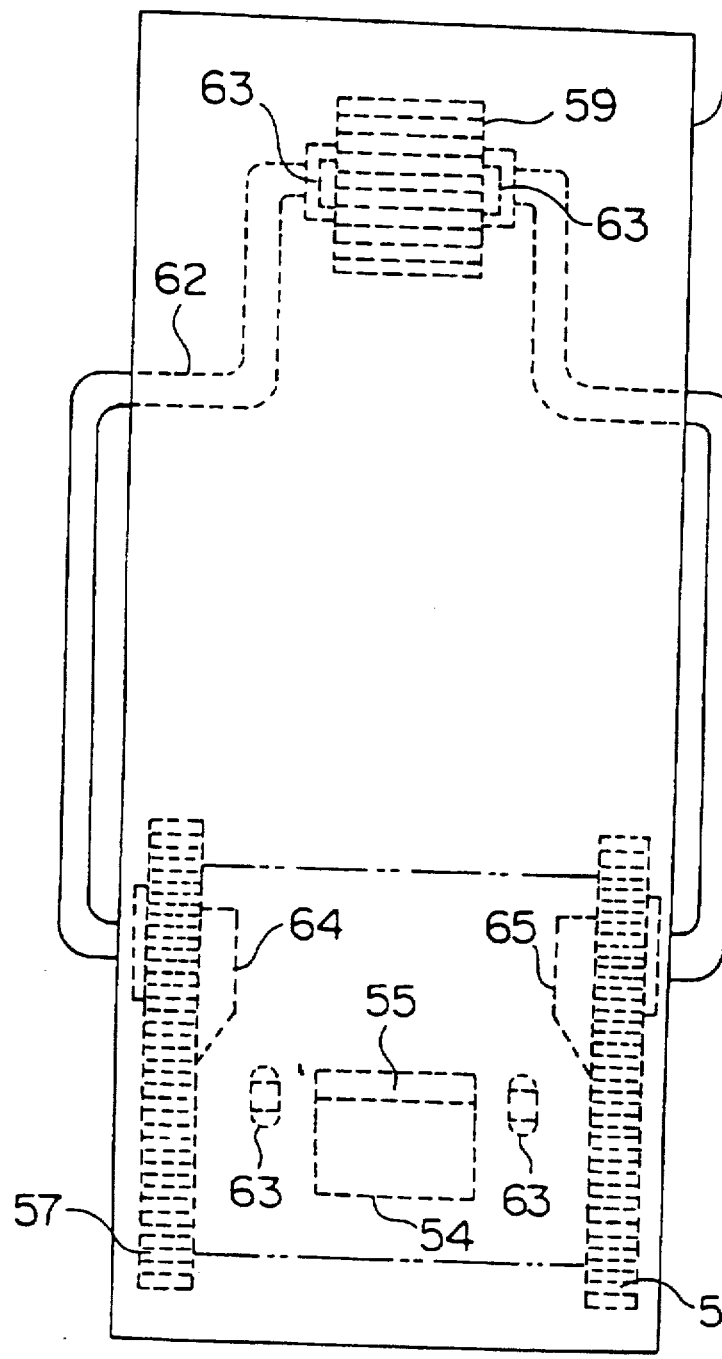
FIG. 48 is a plan view of the traveling device having a solar panel according to the invention.
Figure 49:
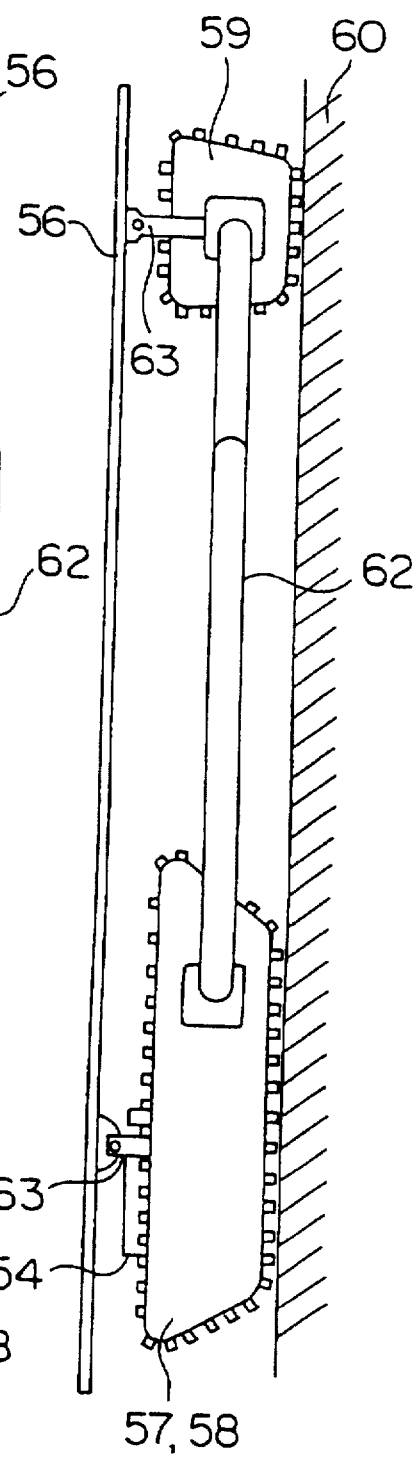
FIG. 49 is a side view of FIG. 48.

FIG. 48 (plan view) and FIG. 49 (side view) respectively show the traveling device in which a generator 54 with an engine, a battery 55 and a solar panel 56 are respectively attached to the endless track as shown in FIG. 4, etc.

Traveling devices 57 and 58 formed of independent endless track shown in FIG. 4, etc. are arranged in parallel with each other at the front portion thereof, and a small traveling device 59 which has the same arrangement as the traveling devices 57 and 58 is arranged at the rear center thereof, wherein the traveling devices 57 and 59, the traveling devices 58 and 59 are respectively coupled to each other by a pair of coupling jigs 62. The generator 54 and the battery 55 are disposed between the traveling devices 57 and 58, and the solar panel 56 is placed on the upper portion of the combination of the traveling devices 57, 58 and 59 by way of a support arm 63. Energy obtained by the solar panel 56 is stored in the battery 55 by way of the generator 54, and it is utilized for driving motors 64 and 65 of the traveling devices 57 and 58. The interval between the traveling devices 57, 58 and 59 can be arbitrarily set conforming to required power.

When a plurality of traveling devices comprising the combination of at least two traveling devices travel, the endless tracks of the plurality of traveling devices can be driven by a single motor. In the case of combining a plurality of traveling devices, each provided with an endless track capable of traveling independently, the number of traveling device can be increased or decreased conforming to the shape of the traveling surface 60 or depending on the size and weight of the object to be conveyed. It is also possible to combine the traveling devices having different sizes.

Figure 50:
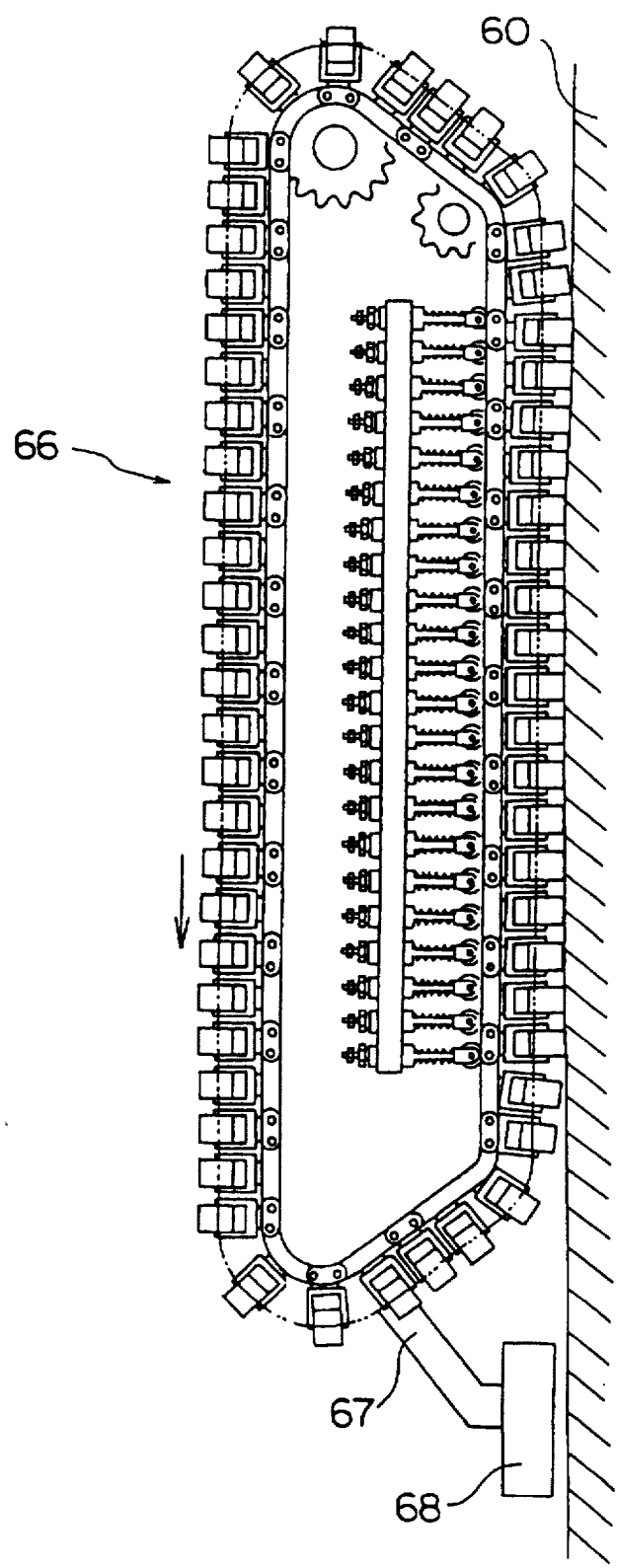
FIG. 50 is a schematic side view of the traveling device having a strong magnet in a traveling direction of an independent endless track magnetic traveling device according to the invention.
Figure 51:
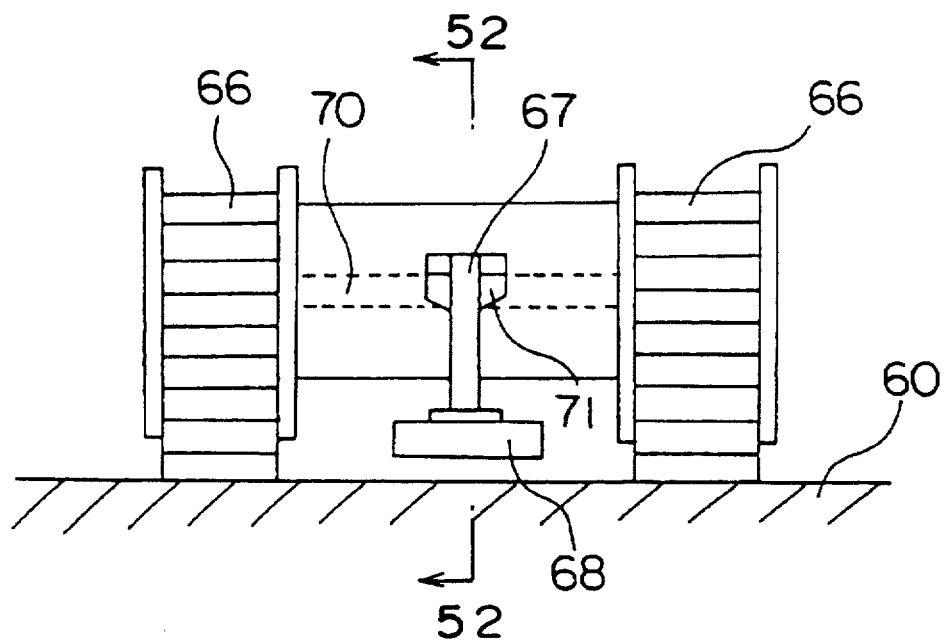
FIG. 51 is a view of the traveling device of FIG. 49 when viewed from the front surface thereof.
Figure 52:
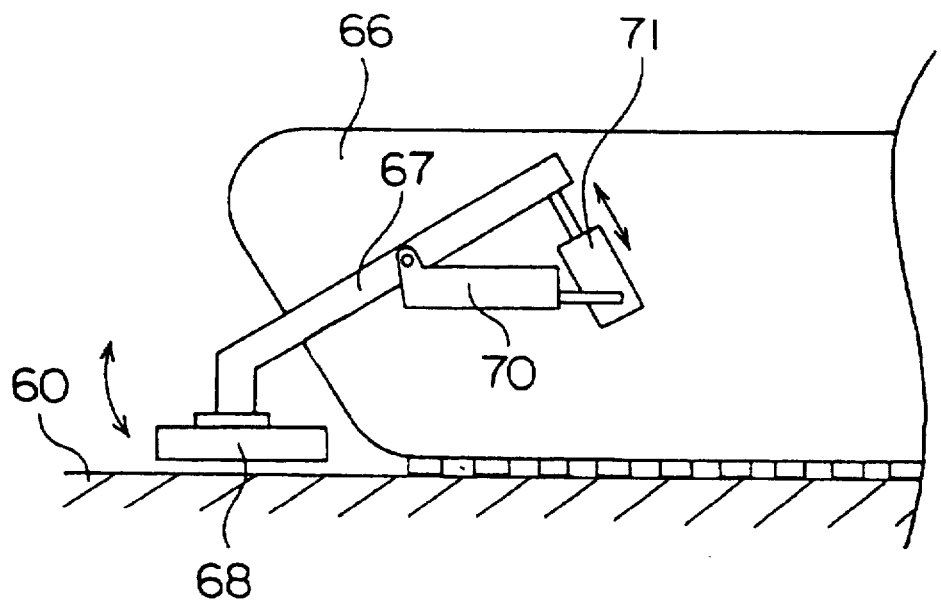
FIG. 52 is a cross sectional view of the traveling device in FIG. 51 taken along line A—A.

FIG. 50 shows a device having a strong magnet 68 which is supported by a vertical moving mechanism 67 in front of the traveling direction of an independent endless track traveling device 66 shown in FIG. 4, FIG. 46, etc. The vertical moving mechanism 67 is supported by a coupling support 70 of the pair of endless tracks 66 as shown in FIGS. 51 and 52 (FIG. 51 is a front view of FIG. 50, FIG. 52 is a view taken along the line A—A in FIG. 51), and it is movable vertically by an actuator 71.

Figure 12:
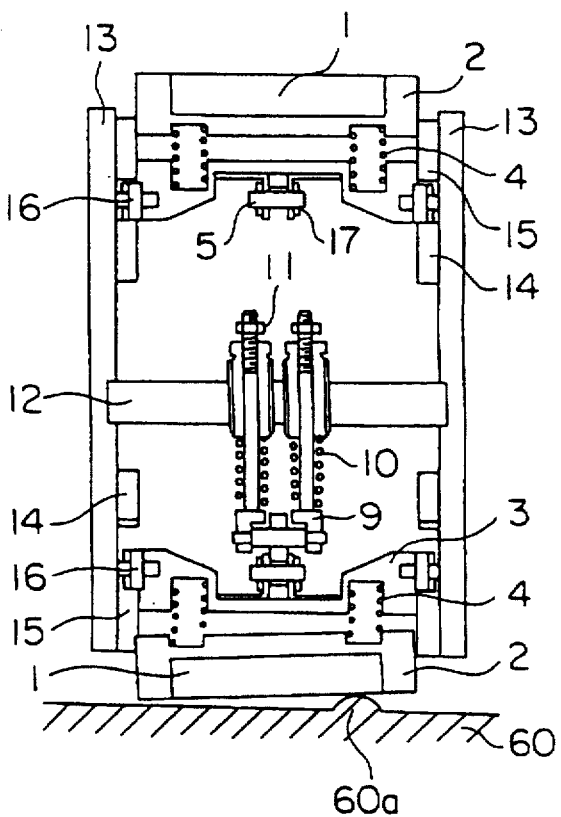
FIG. 12 is a view of an internal structure of the endless track magnetic traveling device in a state where the traveling device travels on an uneven surface (cross sectional view taken along the line B—B in FIG. 4)

The strong magnet 68 fixed to the front surface of the traveling device 66 restrains the traveling device 66 from floating to a minimum after the traveling device gets over the uneven spot 60a of the traveling surface 60 (FIG. 12). Then the vertical moving mechanism 67 is moved up and down, the strong magnet 68 does not interfere with the uneven spot 60a of the traveling surface 60 (FIG. 12).

Figure 53:
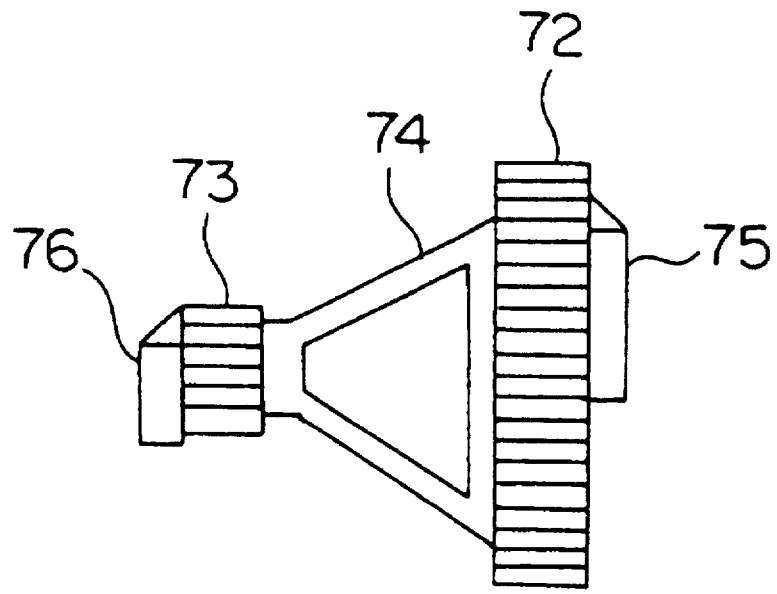
FIG. 53 is a plan view of a traveling device having endless tracks different sizes which are arranged in parallel with each other and coupled to each other by a coupling means.
Figure 54:
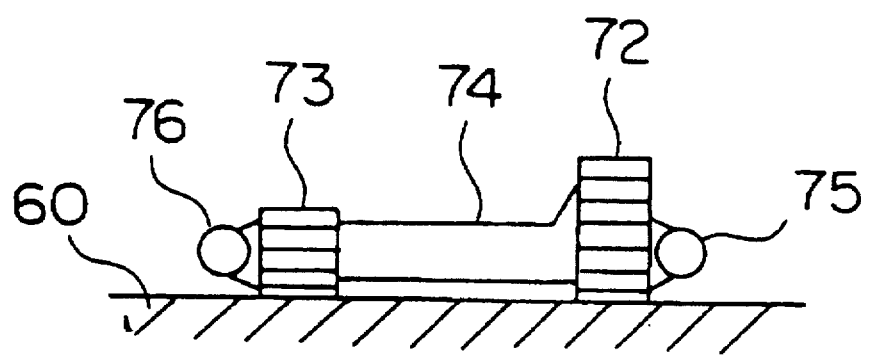
FIG. 54 is a view of the traveling device in FIG. 53 when viewed from the front surface thereof.

FIGS. 53 and 54 (FIG. 53 is a plan view, FIG. 54 is a view when viewed from the front surface thereof) show an endless track magnetic traveling device 72 and an endless track magnetic traveling device 73 which have different sizes and are arranged in parallel with and coupled to each other by a coupling member 74. Motors 75 and 76 are attached to the endless track traveling devices 72 and 73 for driving the endless track traveling devices 72 and 73. The traveling device of the present embodiment can be applied to a non-destructive test of a nozzle of a pressure vessel by combining with an ultrasonic test device.

Figure 55:
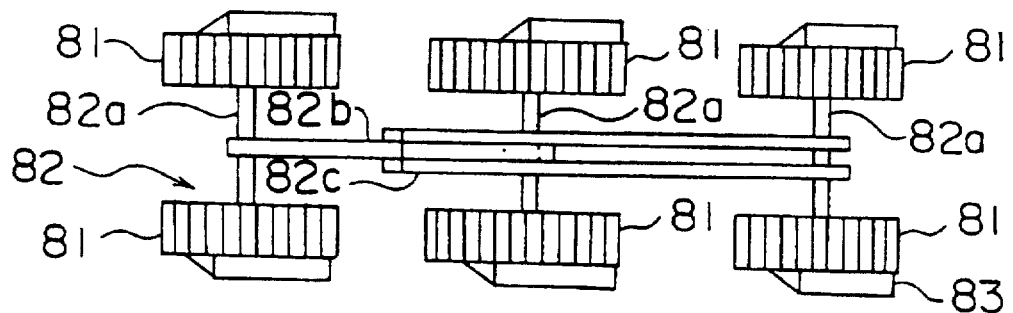
FIG. 55 is a plan view of a traveling device comprising six combined independent endless track magnetic traveling devices according to the invention.
Figure 56:
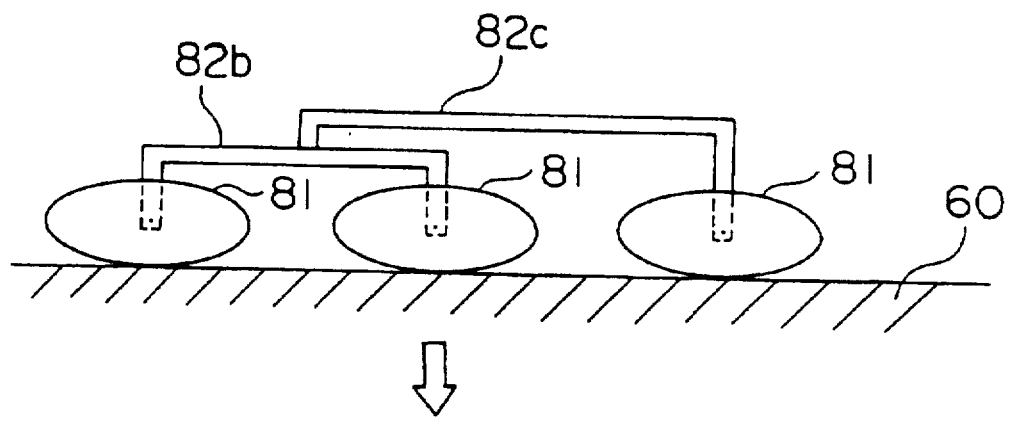
FIG. 56 is a side schematic view of the traveling device in FIG. 55.
Figure 57:
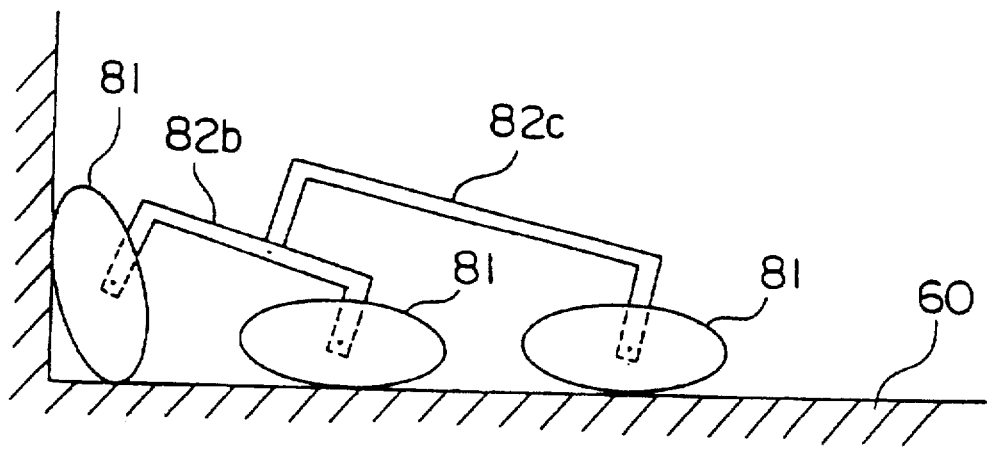
FIG. 57 is another side schematic view of the traveling device in FIG. 55.
Figure 58:
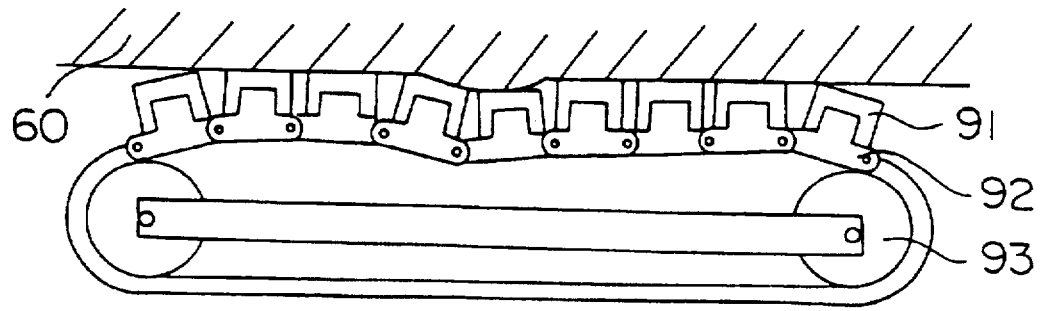
FIG. 58 is a view for explaining a state where a conventional traveling device travels on a ceiling surface.
Figure 59:
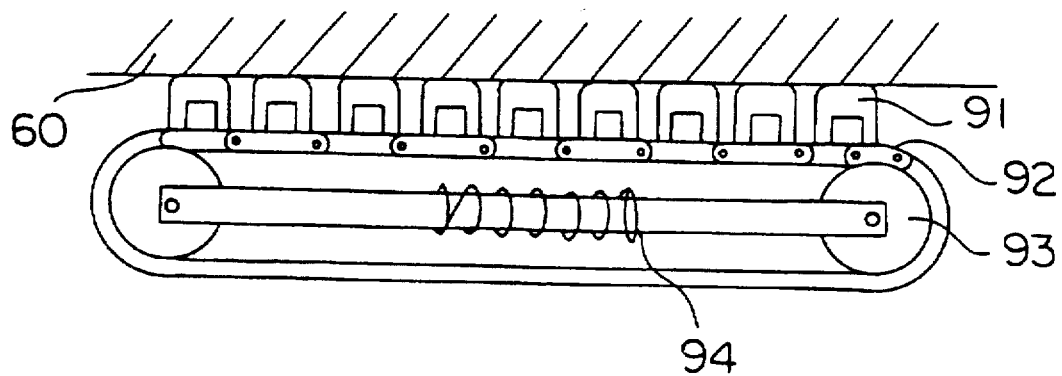
FIG. 59 is a view for explaining another state where a conventional traveling device travels on a ceiling surface.
Figure 60:
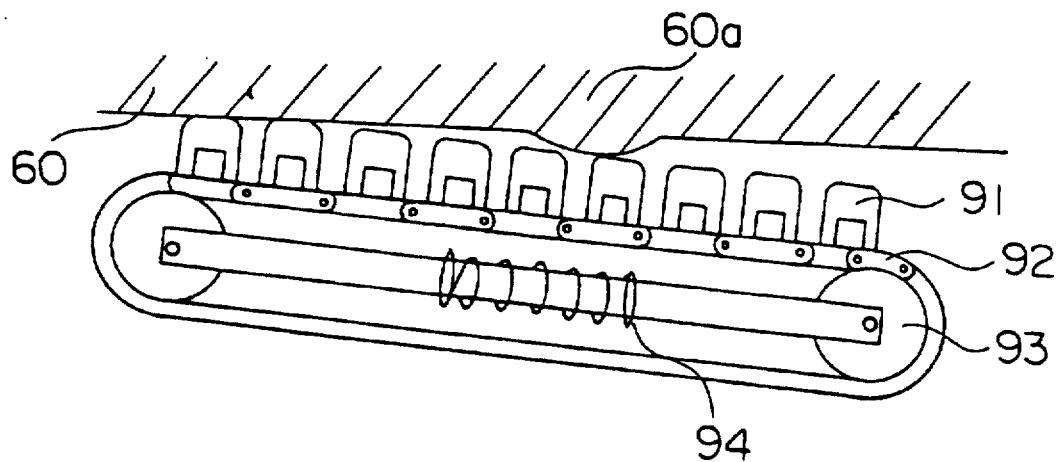
FIG. 60 is a view for explaining still another state where a conventional traveling device travels on a ceiling surface.
Figure 61:
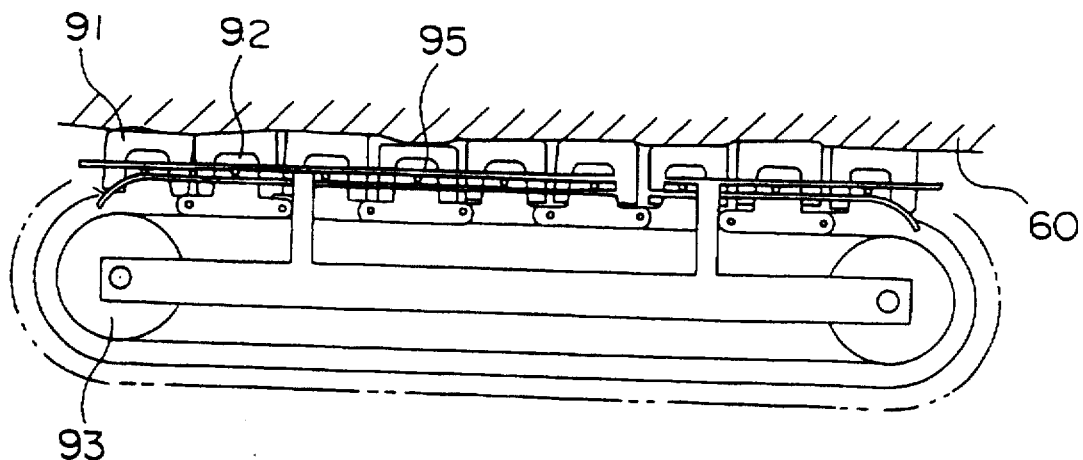
FIG. 61 is a view showing a state where the conventional traveling device travels on a ceiling surface.

FIGS. 55 through 57 show a traveling device in which six endless track magnetic traveling devices 81 which can travel independently are coupled with one another by a coupling member 82. As shown in FIG. 55, the endless track magnetic traveling devices 81 have motors 83 independently whereby the former is driven by the latter. The endless track magnetic traveling devices 81 are arranged in such a manner that three devices 81 coupled in series with each other and arranged in two rows.

The endless track magnetic traveling devices 81 are coupled by the coupling member 82 in which the coupling member 82 comprises coupling portions 82a for coupling two endless track magnetic traveling devices 81 which are arranged in parallel with one another in traveling direction, a coupling portion 82b for coupling the coupling portions 82a between the endless track magnetic traveling devices 81 located at the leading and central positions thereof, and coupling portions 82c arranged in parallel with each other for coupling the coupling portions 82b and the coupling portions 82a between the endless track magnetic traveling devices 81 located at the central and trailing positions thereof. A coupling structure between the coupling portions 82b and 82c is structured to be rotatable so that the traveling device combined by the six endless track magnetic traveling devices 81 can travel at once from the plane surface to the perpendicular surface as shown in FIGS. 56 and 57.

When a plurality of endless track magnetic traveling devices 81 may be combined with one another, not shown in the drawings, the traveling device comprising such a plurality of traveling devices can travel with high attraction efficiency of the magnets 1 (see to FIG. 1) on the traveling surface having a curvature and can easily increase the carriage performance.

The structural components other than the magnet 1 and the motor 7a such as the chain 5, the side plates 13 of the traveling device according to each embodiment of the present invention are formed, e.g. of non-magnetic material such as stainless steel, aluminum, and titanium, thereby lightening the weight thereof and also capable of preventing iron dust, which is generated by wear of the structure of the vehicle body per se, from being attracted thereto.

Industrial Utilization

When the endless track magnetic traveling device of the present invention is employed, the response or follower performance of the traveling device with respect to the uneven spot of the traveling surface is enhanced, and the traveling device can extend its traveling range, which has not been made so far, for example, it can perform continuous traveling from the horizontal surface to the perpendicular surface, and also it can be combined with other apparatus such as a non-destructive test apparatus so as to apply it more widely, e. g., to thickness measuring system of a steel structure. Further, if the traveling device is combined with, e.g., an ultrasonic test device and a TV camera, it can perform the following operations by a remote control which are made at locations where operators can not give access thereto, namely, it can inspect an inside of a pipe, an elevated spot in a large pressure vessel, also can perform inspection in the atmosphere of radioactive rays, and can carry an object and a painting device.

We claim:

1. An endless track magnetic traveling device comprising a vehicle body having side plates at both sides thereof and at least one endless track provided at an outer periphery of the vehicle body, the endless track comprising a plurality of magnets coupled in series in a chain, and the vehicle body comprising a chain driving wheel for driving the endless track while the magnets are attracted to a traveling surface formed of magnetic material, and a driving source for driving the chain driving wheel, said endless track magnetic traveling device further comprising auxiliary wheels each having a suspension, supported by the vehicle body, for pressing the auxiliary wheels against the endless track, elastic members disposed between each magnet and the chain, and an idler wheel meshed with the chain of the endless track and supported by the vehicle body through said elastic members.

2. An endless track magnetic traveling device according to claim 1, wherein plural chain driving wheels, for driving the endless track, and plural idler wheels meshing with the chain are respectively paired, and wherein the chain driving wheels are mounted on a long side of said vehicle body, and the idler wheels are mounted on a short side of said vehicle body.

3. An endless track magnetic traveling device according to claim 1 further comprising adjusting means, on said auxiliary wheels, for adjusting force of said pressing by said suspensions.

4. An endless track magnetic traveling device according to claim 1, wherein the driving source of the chain driving wheel is mounted on one of said side plates.

5. An endless track magnetic traveling device according to claim 1, wherein the driving source of the chain driving wheel has a driving control device controllable by a remote control device.

6. An endless track magnetic traveling device according to claim 1, wherein the chain has means for for preventing the auxiliary wheels from being derailed.

7. An endless track magnetic traveling device according to claim 1, wherein the elastic members respectively disposed between each magnet and the chain are formed of a pair of elastic members which are arranged in parallel with each other at a right angle to a direction of travel of the traveling device.

8. An endless track magnetic traveling device according to claim 1, wherein a space between adjacent magnets and a space between each magnet and the chain are respectively greater than a given value.

9. An endless track magnetic traveling device according to claim 1, wherein each surface of the magnet is coated with a non-magnetic material, and wherein the magnets have elastic members covering at least corners of portions thereof contacting the traveling surface.

10. An endless track magnetic traveling device according to claim 1, wherein the chain and the side plates are flexible with respect to direction of travel of the endless track magnetic traveling device.

11. An endless track magnetic traveling device according to claim 10, wherein each of the side plates of the vehicle body comprise a plurality of side plate pieces which are loosely and elastically coupled to one another in direction of travel and vertically.

12. An endless track magnetic traveling device according to claim 10, wherein the chain is composed of chain units each consisting of a pair of chain side plates which are disposed in parallel with each other and coupling shafts for coupling the pair of chain side plates, said chain units being coupled with adjoining chain units by way of said coupling shafts, and wherein each chain side plate has oval holes through a coupling shaft is inserted, said hole having a major axis larger than the diameter of said coupling shaft, and wherein pitch adjusting collars are disposed at outer peripheries of said coupling shafts for adjusting spacing between the pair of said side plates, and further comprising springs within the pitch adjusting collars for bilging said chain side plates apart.

13. An endless track magnetic traveling device according to claim 10, further comprising steering means for changing direction of travel of the traveling device, said steering means comprising a front steering device connecting between a front portion of the vehicle body and the side plates and a rear steering device connecting a rear portion of the vehicle body and the side plates.

14. An endless track magnetic traveling device according to claim 1, wherein two projections are provided on each of inner sides of said side plates of the vehicle body to define a stroke adjusting portion between said two projections for regulating a stroke range of each endless track and guide wheels are attached to each side plate for moving along the stroke adjusting portion.

15. An endless track magnetic traveling device according to claim 14, wherein each stroke adjusting portion of the side plates has a given curvature.

16. An endless track magnetic traveling device according to claim 1, wherein pressing force and strokes of the suspensions of the auxiliary wheels positioned at the front and rear end portions thereof in a traveling direction of the traveling device are made greater than those positioned at other portions.

17. An endless track magnetic traveling device according to claim 1, wherein the side plates comprising the endless track portion or vehicle body are of an adiabatic structure.

18. An endless track magnetic traveling device according to claim 1, further comprising cooling means for cooling said endless track.

19. An endless track magnetic traveling device according to claim 1, wherein portions of the endless track which do not contact the traveling surface are covered with a combination of high magnetically permeable material and low magnetically permeable material.

20. An endless track magnetic traveling device according to claim 1, wherein the endless tracks other than the magnets, is made of non-magnetic material.

21. An endless track magnetic traveling device according to claim 1, wherein a heater for heating the magnets is provided adjacent the magnets of the endless track portions.

22. An endless track magnetic traveling device according to claim 1, further comprising a liquid seal between the vehicle body and a rotary shaft extending therethrough for transmitting power from the driving source.

23. An endless track magnetic traveling device according to claim 1 further comprising a solar panel.

24. An endless track magnetic traveling device according to claim 23, further including a generator and a battery provided within said vehicle body.

25. An endless track magnetic traveling device comprising a vehicle body and endless tracks formed by coupling a plurality of magnets in a chain, said endless tracks being provided at an outer periphery of the vehicle body, and further comprising chain driving wheels for driving the endless tracks while the magnets are attracted to a traveling surface formed of magnetic material, and a driving source for driving the chain driving wheels, said vehicle body comprising two side plates, coupling means for coupling together the two side plates, and a rotary shaft on which the chain driving wheels are mounted, said rotary shaft having opposing ends respectively supported by said side plates, wherein at least one of said endless tracks is disposed between two side plates, said endless track magnetic traveling device further comprising auxiliary wheels each having a suspension, supported by the vehicle body, for pressing the auxiliary wheels against the endless track, elastic members disposed between each magnet and the chain, and an idler wheel meshed with the chain of the endless track and supported by the vehicle body through said elastic members.

26. An endless track magnetic traveling device according claim 25, wherein two projections are provided on each of inner sides of said side plates of the vehicle body to define a stroke adjusting portion between said two projections for regulating a stroke range of each endless track and guide wheels for moving each stroke adjusting portion are attached to each endless track.

27. An endless track magnetic traveling device according claim 25, wherein the chain and the side plates are flexible with respect to direction of travel of the endless track magnetic traveling device.

28. An endless-track magnetic traveling device according to claim 25, further comprising a coupling device for coupling said endless track magnetic traveling device to another said endless track magnetic traveling device.

29. An endless track magnetic traveling device according to claim 28, comprising front side plates and rear side plates and a steering device, coupled to said front side plates and/or said rear side plates, for changing direction of travel of the traveling device.

30. An endless track magnetic traveling device according to claim 28, wherein the coupling device is divided into plural segments.

31. An endless track magnetic traveling device according to claim 28, wherein said coupling device comprises means for setting an arbitrary coupling angle between coupled endless track magnetic traveling devices.

32. An endless track magnetic traveling device according to claim 28, wherein said coupling device comprises a first coupling member mounted on said two side plates and a second coupling member of said vehicle body of said endless track magnetic traveling device neighboring back-and -forth positions with respect to the traveling direction of said endless track magnetic traveling device capable of coupling with said first coupling member.

33. An endless track magnetic traveling device according to claim 28, wherein said coupling devices for coupling at least two endless track magnetic traveling devices include a coupling mechanism capable of allowing at least one of the devices to travel on a traveling surface three-dimensionally different from those of other devices, the endless track magnetic traveling devices being capable of traveling independently.

34. An endless track magnetic traveling device according to claim 25, further comprising a magnet provided on said endless track magnetic traveling device at a front and/or a back portion thereof relative to direction of travel, said magnet not contacting the traveling surface.

* * * * *

UNITED STATES PATENT AND TRADEMARK OFFICE
CERTIFICATE OF CORRECTION

PATENT NO. : 5,894,901  Page 1 of 3
DATED : April 20, 1999
INVENTOR(S) : AWAMURA et al It is certified that error appears in the above-indentified patent and that said Letters Patent is hereby corrected as shown below:

Col. 1, line 34, after "are" insert --the--.
Col. 2, line 8, "member(" should read --member--;
      line 9, delete "which" insert --(which--;
      line 25, delete "More still" and insert --Still--; and
      line 65, delete "the", second instance.
Col. 3, line 5, delete "that" insert --when--;
      line 26, delete "still other" insert --still another--; and
      line 29, delete "more still other" insert --still another--.
Col. 6, line 30, delete "give" insert --gain--; and
      line 46, "a-plurality" should read --a plurality--.
Col. 8, line 46, "-device" should read --device--.
Col. 10, line 53, delete "a", first instance.
Col. 11, line 37, delete "to";
      line 43, delete "being come" insert --coming--;
      line 46, delete "being come" insert --coming--; and
      line 52, delete "to".
Col. 12, line 13, delete "press" insert --pressing--;
      line 24, delete "60a s" and insert --60 as--;
      line 41, delete "an" and insert --a--;

UNITED STATES PATENT AND TRADEMARK OFFICE
CERTIFICATE OF CORRECTION

PATENT NO. : 5,894,901  
DATED : April 20, 1999  
INVENTOR(S) : AWAMURA et al

It is certified that error appears in the above-indentified patent and that said Letters Patent is hereby corrected as shown below:

```
           line 50, delete "60a s" and insert --60 as--; and
           line 62, delete "likewise" insert --as in--.
Col. 13,   line 5,  delete "60a s" and insert --60 as--; and
           line 13, delete "I" insert --1--.
Col. 14,   line 2,  delete "to";
           line 5,  delete "25";
           line 6,  delete "60a s" insert --60 as--;
           line 7,  delete "to";
           line 21, delete "to";
           line 22, delete "I" insert --1--; and
           line 31, delete "to".
Col. 15,   line 9,  delete "I" insert --1--.
Col. 16,   line 52, delete "I" insert --1--;
           line 53, delete "to", first instance;
           line 57, delete "to" and delete "1, the" insert
--1.  The--; and
           line 61, delete "This" insert --These--.
Col. 17,   line 65, delete "indif-" insert --dif- --.
Col. 18,   line 43, delete "ends" insert --end--.
Col. 19,   line 16, after "of" insert --the--.
Col. 20,   line 5,  delete "radiuses" insert --radii--;
```

UNITED STATES PATENT AND TRADEMARK OFFICE
CERTIFICATE OF CORRECTION

PATENT NO. : 5,894,901
DATED : April 20, 1999
INVENTOR(S) : AWAMURA et al

It is certified that error appears in the above-indentified patent and that said Letters Patent is hereby corrected as shown below:

line 9, delete "radiuses" insert --radii--; and
          line 15, delete "to".
Col. 21, line 7, delete "device" insert --devices--;
          line 23, delete "Then" insert --When--; and
          line 45, after "81" insert --are--.
Col. 22, line 2, after "surface" insert --60--.
Col. 23, line 35, after "through" insert --which--; and
          line 40, delete "bilging" insert --biasing--.
Col. 24, line 10, delete "tracks" insert --track--.

Signed and Sealed this

Seventh Day of December, 1999

Attest:

Q. TODD DICKINSON

*Attesting Officer*     *Acting Commissioner of Patents and Trademarks*